US010239293B2

(12) United States Patent
Dederichs et al.

(10) Patent No.: US 10,239,293 B2
(45) Date of Patent: *Mar. 26, 2019

(54) COMPOSITE PART

(71) Applicant: LANXESS DEUTSCHLAND GMBH, Cologne (DE)

(72) Inventors: Thomas Dederichs, Cologne (DE); Thomas Fruh, Wuppertal (DE); Andreas Bischoff, Dormagen (DE); Ulrich Giese, Hannover (DE); Torsten Thust, Cologne (DE)

(73) Assignee: LANXESS Deutschland GmbH, Cologne (DE)

( * ) Notice: Subject to any disclaimer, the term of this patent is extended or adjusted under 35 U.S.C. 154(b) by 145 days.

This patent is subject to a terminal disclaimer.

(21) Appl. No.: 15/319,595

(22) PCT Filed: Jun. 19, 2015

(86) PCT No.: PCT/EP2015/063846
§ 371 (c)(1),
(2) Date: Dec. 16, 2016

(87) PCT Pub. No.: WO2015/193487
PCT Pub. Date: Dec. 23, 2015

(65) Prior Publication Data
US 2017/0320301 A1 Nov. 9, 2017

(30) Foreign Application Priority Data
Jun. 20, 2014 (EP) .................................... 14173311

(51) Int. Cl.
B32B 27/18 (2006.01)
B32B 25/08 (2006.01)
B32B 27/32 (2006.01)
B32B 27/34 (2006.01)
B29C 45/00 (2006.01)

(52) U.S. Cl.
CPC .............. B32B 27/18 (2013.01); B32B 25/08 (2013.01); B32B 27/32 (2013.01); B32B 27/34 (2013.01); B29C 45/00 (2013.01); B32B 2262/101 (2013.01); B32B 2270/00 (2013.01)

(58) Field of Classification Search
CPC ......... B32B 27/18; B32B 25/08; B32B 27/32; B32B 27/34
See application file for complete search history.

(56) References Cited

U.S. PATENT DOCUMENTS

| 3,773,732 | A | 11/1973 | Dillenschneider |
| 4,559,688 | A | 12/1985 | Abu-Isa et al. |
| 4,826,721 | A | 5/1989 | Obrecht et al. |
| 5,132,182 | A | 7/1992 | Grosse-Puppendahl et al. |
| 5,153,076 | A | 10/1992 | Jadamus et al. |
| 5,468,288 | A | 11/1995 | Steger et al. |
| 7,553,912 | B2 | 6/2009 | Ikuta et al. |
| 7,798,188 | B2 | 9/2010 | Sakai et al. |
| 8,029,910 | B2 | 10/2011 | Ikuta et al. |
| 8,759,437 | B2 | 6/2014 | Pawlik et al. |
| 2006/0149000 | A1* | 7/2006 | Ikuta ................. C08F 291/00 525/343 |
| 2009/0131592 | A1* | 5/2009 | Sakai ...................... B32B 25/08 525/190 |
| 2010/0282383 | A1 | 11/2010 | Ikuta |
| 2013/0092226 | A1 | 4/2013 | Pawlik et al. |
| 2015/0125685 | A1 | 5/2015 | Kitano et al. |

FOREIGN PATENT DOCUMENTS

| EP | 2392610 A1 | 12/2011 |
| JP | 2001162722 A2 | 6/2001 |
| JP | 2010269481 A2 | 12/2010 |

OTHER PUBLICATIONS

International Search Report for corresponding International Application No. PCT/EP2015/063846, dated Sep. 21, 2015, three pages.
Notification of the First Office Action from the State Intellectual Property Office of the People's Republic of China for corresponding Application No. 2015800333996, dated Jan. 29, 2018, 7 pages.

* cited by examiner

Primary Examiner — John E Uselding

(57) ABSTRACT

The invention relates to a composite part, hereinafter also referred to as composite, which is produced by means of 2-component processing methods, preferably 2-component injection molding (2K injection molding), from at least one part composed of at least one polyamide molding composition additized with polybutadiene copolymer which is livid at room temperature and at least one part composed of at least one elastomer obtainable from rubber that is to be vulcanized or crosslinked with elemental sulphur, or is composed of these components after processing thereof.

17 Claims, No Drawings

COMPOSITE PART

COMPOSITE PART

The invention relates to a composite part, hereinafter also referred to as composite, which is produced by means of 2-component processing methods, preferably 2-component injection moulding (2K injection moulding), from at least one part composed of at least one polyamide moulding composition additized with a polybutadiene copolymer which is liquid at room temperature and at least one part composed of at least one elastomer obtainable from rubber that is to be vulcanized or crosslinked with elemental sulphur, or is composed of these components after processing thereof.

Composite parts composed of stiff thermoplastic and elastomeric mouldings are typically joined by adhesive bonding, screw connection, mechanical interlocking or with use of an adhesion promoter, since it is not possible to achieve sufficiently strong adhesion in the vast majority of combinations of thermoplastic and elastomer.

PRIOR ART

In the prior art, there are numerous disclosures of a composite composed of polyamide and elastomer, obtainable from rubber that is to be vulcanized or crosslinked with elemental sulphur, with use of adhesion promoters. The adhesion promoter is applied to the component, either the thermoplastic or elastomer, which has been manufactured first. If the thermoplastic component is produced first, the adhesion promoter is applied to the surface of the thermoplastic, then the rubber mixture to be crosslinked is sprayed on and vulcanized. If the elastomer is manufactured first, the adhesion promoter is applied to the surface thereof before the thermoplastic is sprayed on. Depending on the material combination, a one-layer or two-layer bonding system is used. Adhesion promoters that are used in a customary and preferred manner are mentioned in J. Schnetger "Lexikon der Kautschuktechnik" [Lexicon of Rubber Technology], 3rd edition, Hëthig Verlag Heidelberg, 2004, page 203, and in B. Crowther, "Handbook of Rubber Bonding", iSmithers Rapra Publishing, 2001, pages 3 to 53. Particular preference is given to using at least one adhesion promoter of the Chemlok® or Chemosil® brand (from Lord) or of the Cilbond® brand (from CIL). When adhesion promoters are used, the use of environmentally harmful solvents and/or heavy metals is a problem in principle, unless water-based adhesion promoters are used.

Generally, the application of an adhesion promoter constitutes an additional operating step which entails an additional operation and therefore takes time and effort.

EP 0 142 930 A2 shows a way in which composites can be produced from polyamides and EPDM elastomers. This involves adding a mixture of the crosslinking agent dicumyl peroxide and the coagent N,N'-m-phenylenedimaleimide to the rubber. The addition of the coagent N,N'-m-phenylenedimaleimide is essential here for high bond strengths. However, the process described in EP 0 142 930 A2 is performable only with a peroxidically crosslinked elastomer component. If vulcanization with sulphur is used, this does not result in adhesion.

U.S. Pat. No. 5,132,182 states that polyamides having an excess of amino end groups have good adhesion to carboxylated EPDM or NBA rubbers. According to U.S. Pat. No. 5,132,182, it is only possible to use rubbers chemically modified by carboxylation. Moreover, the process described therein is reduced to peroxide crosslinking of the elastomer component. A sulphur-vulcanized elastomer does not show any adhesion to the polyamide.

EP 1 552 965 A1 describes rubber-reinforced structures comprising polyamide-based resin compositions and at least one peroxidically crosslinked rubber component bonded to the resin component without adhesive. Crosslinking of the rubber mixture with the sulphur donor tetramethylthiuram disulphide with addition of the vulcanization activator trimethylolpropane trimethacrylate achieves only a moderate adhesion value "B".

EP 1 666 535 A1 describes composite parts which are produced from an elastomer component and a polyamide component in direct adhesion. In this case, coagents for peroxidic crosslinking and free radical-scavenging stabilizers are added to the polyamide component. However, EP 1 666 535 A1 exclusively teaches the crosslinking of the rubber component with an organic peroxide for direct adhesion in combination with a polyamide component.

EP 1 533 344 A1 and JP 2003 320 818 A1 describe the use of coagents for peroxidic crosslinking in a thermoplastic, in order to produce a composite part with an elastomer component in direct adhesion. Example 5 of EP 1533 344 A1 teaches, as well as the coagent trimethylolpropane trimethacrylate, also the addition of Vestenamer® 8012/polyoctenamer in polyamide PA612. However, the process has disadvantages. The examples of ER 1 533 344 A1 disclose exclusively the crosslinking of the rubber component with an organic peroxide for direct adhesion in combination with a polyamide component.

The direct adhesion of polyamide-based mouldings to peroxidically crosslinked elastomers and composite parts based thereon are known from the prior art, but not the direct adhesion of polyamide-based mouldings to elastomers crosslinked with elemental sulphur or composites based thereon. However, crosslinking of rubbers via sulphur vulcanization is of far greater significance to the rubber industry than peroxide crosslinking (F. Röthemeyer, F. Sommer "Kautschuktechnologie" [Rubber Technology], 2nd revised edition, Carl Hanser Verlag Munich Vienna, 2006, pages 69 to 70, page 87, page 93, page 102, page 147, pages 276 to 277, page 312 and pages 320 to 321). There are a number of reasons for this. Sulphur vulcanization is cheaper than peroxide crosslinking and is therefore far more common in industry than crosslinking via peroxides. Finally, it is possible by sulphur vulcanization to obtain vulcanizates superior to the peroxide vulcanizates, in terms of their dynamic material properties, tear strength and tear propagation resistance. Furthermore, particular rubbers cannot be crosslinked with peroxides at all, for example butyl rubber (IIR) and halobutyl rubber (XIIR), and peroxide crosslinking is of no practical significance for some rubbers, particularly for natural rubber (NR), the economically most important rubber, but also for butadiene rubber (BR), isoprene rubber (IR) and styrene-butadiene rubber (SBR). In these cases, sulphur vulcanization is the dominant crosslinking conditions. Peroxide crosslinking is additionally sensitive to atmospheric oxygen, which leads to a restriction of the possible vulcanization methods. Finally, because of the crosslinking mechanism via free radicals, various mixture constituents can disrupt peroxide crosslinking. In contrast, sulphur vulcanization is insensitive to most of the other mixture constituents to be used in the rubber.

The conventional 2-component injection-moulded composite according to the teaching of DE 3602705 A1, composed of directly adhering components comprising polyphenylene ethers (PPEs) on the one hand and sulphur-vulcanized elastomers, for example styrene-butadiene rubber (SBR), on the other hand is based on the special case of thermodynamic compatibility and for this reason cannot be applied to composites composed of a polyamide (PA) part on the one hand and a sulphur-vulcanized elastomer part on the other hand. There is therefore a long-standing need on the market for a solution for composite parts consisting of a polyamide component and an elastomer component the latter of which is obtained from a rubber which is to be crosslinked or vulcanized with elemental sulphur.

In the case of bonding of a thermoplastic component manufactured in a first production step with an elastomer component using an adhesion promoter, as mentioned above, or with direct adhesion, the crosslinking system in the rubber mixture plays a crucial role for the level of bond strength. This important role of the crosslinking system can be observed not just in the bonding of thermoplastic component with rubber mixtures to be crosslinked, but generally in the bonding of different substrate materials manufactured in a first production step, for example metal, glass, etc., with rubber mixtures to be crosslinked.

When adhesion promoters are used to bond metal with rubber mixtures to be crosslinked, the choice of crosslinking agent can have a marked effect on the adhesion (B. Crowther, "Handbook of Rubber Bonding", iSmithers Rapra Publishing, 2001, pages 57 to 79). Manufacturers of adhesion promoters make a distinction between sulphur and peroxide crosslinking in the case of use of adhesion promoters for the bonding of rubber mixtures that are to be crosslinked on metal substrates and solid polymer substrates. Lord Corporation supplies various adhesion promoters for rubber mixtures that are to be crosslinked with sulphur and for rubber mixtures that are to be crosslinked with peroxides under the Chemsil® brand (Lord Product Brochure "Rubber-to-Substrate Adhesives for the Industry", Lord Application Guide "Chemlok® Elastomer Bonding Guide", Lord Corporation, Cary, USA). In the Product Selector at http://cilbond.com (retrieved on Dec. 16, 2003) from the adhesion promoters manufacturer Chemical innovations Limited, Preston, UK, for selection of the adhesion promoter to be used, the selection of the elastomers to be bound results in a decision between different crosslinking agents. Thus, for example, in the case of HNBR rubber mixtures, a choice has to be made between sulphur crosslinking and peroxide crosslinking.

In the case of direct adhesion too, i.e. when the rubber mixture to be crosslinked is applied directly to the substrate, for example the thermoplastic component, without the use of an adhesion promoter and is caused to form an adhesive bond during the crosslinking of the rubber component, the crosslinking agent makes a quite crucial contribution to the adhesion between substrate and elastomer.

With regard to the adhesion to metal surfaces, brass-plated metal parts or brass substrates in general can be bonded directly to rubber mixtures that are to be crosslinked with sulphur. Rubber mixtures that can be crosslinked with peroxides cannot be bonded directly to brass (B. Crowther, "Handbook of Rubber Bonding", iSmithers Rapra Publishing, 2001, pages 163 to 195). Nor can zinc-plated metal parts be made to adhere directly to rubber mixtures that are to be crosslinked with sulphur (F. Röthemeyer, F. Sommer "Kautschuktechnologie", 2nd revised edition, Carl Hanser Verlag Munich Vienna, 2008, pages 829 to 830). For direct adhesion to metal surfaces, specific coagents are added to the rubber mixtures having a peroxidic crosslinking system, preferably metal salts of acrylic acid or methacrylic acid, especially zinc dimethacrylate. The addition of these coagents to rubber mixtures that are to be crosslinked with sulphur does not lead to the desired results in direct adhesion to metal (F. Röthemeyer, F. Sommer "Kautschuktechnologie", 2nd revised edition, Can Hanger Verlag Munich Vienna, 2006, pages 829 to 830; B. Crowther, "Handbook of Rubber Bonding", iSmithers Rapra Publishing, 2001, pages 213 to 240).

In the case of direct adhesion to polymers, in the context of the present invention to polyamides, the crosslinking agent is therefore of quite crucial significance in the rubber mixture. According to relevant textbook literature, rubbers having C═C double bonds, i.e. those that are crosslinkable in principle with sulphur, or mixtures thereof, can be directly bonded to polyamide with peroxide crosslinking. While it is also possible to use a number of possible crosslinking agents for other polymer/elastomer combinations, the only descriptions to date for XNBR have been of peroxide crosslinking with PA612 (Handbuch Kunstoff-Verbindungstechnik [Handbook of Polymer Bonding Technology], edited by G. W. Ehrenstein, Carl Hanser Verlag Munich Vienna, 1990, pages 530 to 531; F. Röthemeyer, F. Sommer "Kautschuktechnologie", 2nd revised edition, Carl Hanser Verlag Munich Vienna, 2006, pages 833 to 834). Polyamide moulding compositions based on PA612 for direct adhesion with rubber mixtures that are to be crosslinked by peroxidic means are commercially available as Vestamid® from Evonik Degussa GmbH, Marl. The prior art relating to the use of these Vestamid® products is now more developed, such that they can be used not just with XNBR rubber mixtures that are to be crosslinked by peroxidic means (G. Huhn, Gummi Fasem Kunststoffe, 2000, volume 53, issue 10, pages 720 to 721), but also with NBR rubber mixtures that are to be crosslinked by peroxidic means (K. M. Diedrich, Gummi Fasern Kunststoffe, 2003, volume 56, issue 5, pages 306 to 311) and EPDM rubber mixtures that are to be crosslinked by peroxidic means (F. Lorenz, K. Kuhmann, KunstStoff Trends, 2008, issue 4, pages 28 to 29; "High-Performance Polymers in Plastic-Rubber Composites" brochure, Evonik Degussa GmbH, Marl). While a number of crosslinking agents, including sulphur, have been published for other polymers and elastomers for direct adhesion, it is remarkable and should therefore be emphasized that, in spite of these further developments for rubbers having C═C double bonds that are crosslinkable with sulphur in principle, only the peroxide crosslinking agent has been usable to date in the case of polyamide. It has not been possible to date to use sulphur successfully as a crosslinker for rubber components if they were intended for a composite in direct adhesion with a polyamide component.

The findings from the prior art relating to composites of rubbers with inorganic substrates such as metals or glass cannot be applied to organic substrates, preferably polymers, especially polyamides. This is because organic additives are usually added especially to polymers such as polyamide in order to achieve particular properties in the product to be manufactured therefrom at a later stage. Thus, while the use of organic additives is entirely customary in the case of polymers such as polyamide, organic additives in metals or glass would be destroyed at the high processing temperatures of metals or glass, whether by breakdown in the absence of air or oxidation by atmospheric oxygen.

For the adhesion of rubber mixtures that are to be crosslinked on organic substrate surfaces, preferably plastics, especially polyamide, it can thus be stated as a general summary that the crosslinking agent is of crucial significance and that especially direct adhesion processes based on the crosslinking of a rubber mixture with peroxides are not comparable to direct adhesion processes based on crosslinking with sulphur.

Proceeding from this prior art, the problem addressed was that of providing a method for producing a firm bond between directly adhering parts, one part being obtainable from a polyamide moulding composition and one part being composed of an elastomer component obtainable from rubber that is to be vulcanized or crosslinked with elemental sulphur.

It has been found that, surprisingly, the problem described above for the present invention is solved if solely the polyamide moulding composition is additized with polybutadiene copolymer which is liquid at room temperature (RT) and if elemental sulphur is used for vulcanizing the elastomer component, obtainable from rubber to be crosslinked or vulcanized with elemental sulphur. It has additionally been found that, surprisingly, with the procedure of the invention, it is possible to do without adhesion promoters of any kind and yet to achieve high adhesion values with a bond strength in a 90° peel test based on DIN ISO 613 of at least 3 N/mm, and a tensile stress at break of the elastomer component of at least 10 MPa and a tensile strain at break of the elastomer component of at least 300%.

Invention

The subject of the invention is a composite part composed of at least one part produced from at least one polyamide moulding composition and at least one part produced from at least one elastomer, characterized in that the polyamide moulding composition contains a mixture of polyamide with at least one polybutadiene copolymer which is liquid at room temperature (RT), and the elastomer part has been produced from rubber to be vulcanized or crosslinked with elemental sulphur.

The individual parts of the composite part of the invention are shaped macroscopic parts, but not, for example, dispersed particles in a plastics/elastomer blend and also not polyamide fibres in an elastomer matrix. Such blends are therefore no composite parts for the purposes of the invention.

Preferred Embodiments of the Invention

For clarification it is noted that the ambit of the present invention encompasses all definitions and parameters that are stated generally or in ranges of preference, as set out below, in any desired combinations. Unless otherwise indicated, all percentages are percentages by weight. Unless otherwise indicated, all figures are based on room temperature (RT)=23+/−2° C. and standard pressure of 1.0 bar.

Surprisingly, for producing a composite of the invention, it is possible to do without adhesion promoters of any kind and yet to obtain high adhesion values with a bond strength in a 90° peel test based on DIN ISO 813 of at least 3 N/mm, and a tensile stress at break of the elastomer component of at least 10 MPa and a tensile strain at break of the elastomer component of at least 300%. With preference in accordance with the invention, therefore, no adhesion promoters between the polyamide part and the elastomer part are used at all.

With preference in accordance with the invention, a composite part is obtained in direct adhesion.

A preferred subject of the invention is a composite part composed of at least one part produced from at least one polyamide moulding composition and at least one part produced from at least one elastomer, characterized in that the polyamide moulding composition contains at least 30% by weight, preferably at least 45% by weight, more preferably at least 55% by weight and especially preferably at least 65% by weight of a mixture of a) 60 to 99.9 parts by weight, preferably 75 to 99.8 parts by weight, more preferably 85 to 99.7 parts by weight and very preferably 88 to 99.5 parts by weight of polyamide and b) 0.1 to 40 parts by weight, preferably 0.2 to 25 parts by weight, more preferably 0.3 to 15 parts by weight, very preferably 0.5 to 12 parts by weight of at least one polybutadiene copolymer which is liquid at RT, where the sum of the parts by weight of a) and b) is 100 and the elastomer part has been produced from rubber to be vulcanized or crosslinked with elemental sulphur.

Further subjects of the invention are a method for producing such composite parts and also the use of polybutadiene copolymer for improving the composite adhesion of polyamide-based mouldings with an elastomer component obtainable from rubber to be crosslinked or vulcanized with elemental sulphur.

According to the invention, a firm bond of an elastomer component to a polyamide component means a bond strength in a 90° peel test based on DIN ISO 813 of at least 3 N/mm, and a tensile stress at break of the elastomer component of at least 10 MPa and a tensile strain at break of the elastomer component of at least 300%.

According to the invention, a firm bond between a part obtainable from a polyamide moulding composition and a part composed of an elastomer component obtainable from rubber that is to be vulcanized or crosslinked with elemental sulphur features a bond strength in a 90° peel test based on DIN ISO 613 of at least 3 N/mm. Bond strengths below 3 N/mm are too low for the presence of a firm bond. Low bond strengths below 3 N/mm are also referred to as assembly adhesion in industrial practice. A minimum bond strength of 3 N/mm has been found to be a useful criterion for a firm bond between a polyimide part and an elastomer part. For example, JP2010269481 A2 describes bond strengths of a bond between a polyamide part and an elastomer part, measured by a peel test, as follows: <3 N/mm; unacceptable, ≥3 N/mm and ≤4 N/mm: good, >4 N/mm: excellent.

Tensile stress at break or breaking stress and tensile strain at break or breaking strain are materials testing parameters which are determined in a tensile test (F. Röthemeyer, F. Sommer "Kautschuktechnologie", 2nd revised edition, Carl Hanser Verlag Munich Vienna, 2006, pages 494 to 496; Die Kunststoffe—Chemie, Physik, Technologie [Plastics—Chemistry, Physics, Technology], edited by B. Carlowitz, Carl Hanser Verlag Munich Vienna, 1990, p. 628 to 633). DIN 53504 describes a method for determining the tensile stress/strain properties of vulcanized and thermoplastic rubbers. The properties which can be determined are tensile strength, breaking stress, breaking strain, stress at a given strain, elongation at a given stress, tensile stress at yield and tensile strain at yield. Tensile testing involves stretching the specimens at a constant rate of extension until they break and recording the force and change in length required. Tensile stress at break and tensile strain at break are determined in the context of the present invention by tensile tests analogous to DIN 53504. Tensile stress at break $G_R$, also called tear strength, is defined as the quotient of the force $F_R$ measured at the moment of break and the starting cross section $A_0$ of the specimen. Tensile stress at break is reported in N/mm$^2$ or MPa. Tensile strain at break $\varepsilon_R$ is defined as the quotient of the change in length $L_R$-$L_0$ measured at the moment of break and the original measured length $L_0$ of the specimen. Tensile strain at break is reported in percent.

A tensile stress at break of at least 10 MPa and a tensile strain at break of at least 300% describes an industrially utilizable elastomer component. Industrially utilizable elastomers are obtained via the crosslinking of rubbers, for example via sulphur or peroxide crosslinking. With rising crosslinking density, i.e. the number of crosslinking sites per volume element, tear strength of elastomers passes through a maximum (D. L. Hertz Jr., Elastomerics, 1984, issue 116, pages 17 to 21; Science and Technology of Rubber, edited by J. E. Mark, B. Erman, F. R. Eirich, 2nd edition, Academic Press, San Diego, 1994, pages 339 to 343). Accordingly, an industrially utilizable elastomer is obtained only within a particular range of crosslinking density, if crosslinking density is too low or too high, tensile stress at break will be less than 10 MPa.

The tensile stress at break of crosslinked elastomers is also influenced to a crucial degree by the addition of additives or fillers. Such additives or fillers are pulverulent rubber mixture constituents which are added to the elastomer in order to achieve particular properties in the vulcanizate (J. Schnetger "Lexikon der Kautschuktechnik" 3rd edition, Hüthig Verlag Heidelberg, 2004, pages 179 to 180; F. Röthemeyer, F. Sommer "Kautschuktechnologie", 2nd revised edition, Carl Hanser Verlag Munich Vienna, 2006, pages 231 to 275). While inactive fillers having comparatively large particle diameters dilute the matrix, active fillers, especially carbon black or silica having a particle diameter below that of the inactive fillers, have a reinforcing effect on the elastomer. Various parameters such as tensile stress at break and tensile strain at break pass through a maximum with increasing content of active fillers. Active fillers are thus added to industrially utilizable elastomers in a certain content for the achievement of a minimum tensile stress at break and a minimum tensile strain at break.

The present invention also provides for the use of the composite parts that are to be produced in accordance with the invention in products that conduct liquid media or gaseous media, preferably at high temperatures or under the influence of nonpolar media, in the chemical industry, the domestic appliance industry or the motor vehicle industry.

Particularly preferred is the use of the inventive composite parts as gaskets, membranes, gas pressure accumulators, hoses, housings for motors, pumps and electrically operated tools, rollers, tyres, couplings, stop buffers, conveyor belts, drive belts, multilayer laminates and multilayer films, and also sound- or vibration-deadening components.

The present invention therefore also relates to a method for sealing products that contain liquid media and/or gaseous media using at least one inventive composite part.

The present invention therefore also relates to a method for producing a composite part that is composed of at least one part produced from at least one polyamide moulding composition and at least one part produced from at least one elastomer, obtainable from rubber that is to be vulcanized or crosslinked with elemental sulphur as crosslinking agent, by using at least one shaping method either to apply a rubber component comprising elemental sulphur to the part comprising the polyamide moulding composition and by exposing this system to the vulcanizing conditions of the rubber, or to apply a polyamide moulding composition to the part comprising rubber crosslinked with elemental sulphur, the polyamide moulding composition comprising a mixture of polyamide with at least one polybutadiene copolymer which is liquid at room temperature (RT).

The present invention relates with preference to a method for producing a composite composed of at least one part produced from at least one polyamide moulding composition and at least one part produced from at least one elastomer obtainable from rubber to be crosslinked or vulcanized with elemental sulphur as crosslinking agent, characterized in that by at least one shaping method either the part composed of the polyamide moulding composition is contacted with a rubber component comprising elemental sulphur and subjected to the vulcanization conditions for the rubber, or the part composed of elastomer crosslinked with elemental sulphur as crosslinking agent is contacted with a polyamide moulding composition, and, in both cases, the polyamide moulding composition contains at least 30% by weight, preferably at least 45% by weight, more preferably at least 55% by weight and especially preferably at least 65% by weight of a mixture of
  a) 60 to 99.9 g parts by weight, preferably 75 to 99.8 parts by weight, more preferably 85 to 99.7 parts by weight and most preferably 88 to 99.5 parts by weight of polyamide and
  b) 0.1 to 40 parts by weight, preferably 0.2 to 25 parts by weight, more preferably 0.3 to 15 parts by weight, most preferably 0.5 to 12 parts by weight, of at least one polybutadiene copolymer which is liquid at RT,
  where the sum total of the parts by weight of a) and b) is 100.

Shaping methods are to be selected preferably from the series consisting of extrusion, flat-film extrusion, film blowing, extrusion-blow moulding, coextrusion, calendering, casting, pressing methods, injection embossing methods, transfer pressing methods, transfer injection pressing methods or injection moulding, or specialist processes of these, particularly gas injection technology, more preferably by means of two-component injection moulding.

The present invention relates, moreover, to a composite composed of at least one part produced from at least one polyamide moulding composition and at least one part produced from at least one elastomer obtainable from rubber to be cross/inked or vulcanized with elemental sulphur as crosslinking agent, obtainable by at least one shaping method, by applying a rubber component comprising elemental sulphur as crosslinking agent to the part composed of the polyamide moulding composition and exposing the system to the vulcanizing conditions of the rubber, or by applying a polyamide moulding composition to the part comprising elastomer crosslinked with elemental sulphur.

The present invention preferably relates to a composite composed of at least one part produced from at least one polyamide moulding composition and at least one part produced from at least one elastomer, obtainable from rubber that is to be vulcanized or crosslinked with elemental sulphur as crosslinking agent, obtainable by at least one shaping method, by contacting the part composed of the polyamide moulding composition with a rubber component comprising elemental sulphur as crosslinking agent and subjecting it to the vulcanization conditions for the rubber, or by contacting the part composed of elemental sulphur-crosslinked elastomer with a polyamide moulding composition, and, in both cases, the polyamide moulding composition contains at least 30% by weight, preferably at least 45% by weight, more preferably at least 55% by weight and especially preferably at least 65% by weight of a mixture of
  a) 60 to 99.9 parts by weight, preferably 75 to 99.8 parts by weight, more preferably 85 to 99.7 parts by weight and most preferably 88 to 99.5 parts by weight of polyamide and b) 0.1 to 40 parts by weight, preferably 0.2 to 25 parts by weight, more preferably 0.3 to 15 parts by weight, most preferably 0.5 to 12 parts by weight, of at least one polybutadiene copolymer which is liquid at RT, where the sum total of the parts by weight of a) and b) is 100.

Liquid Polybutadiene Copolymer

In accordance with the invention the polyamide moulding composition for the polyamide part is as additized with at least one polybutadiene copolymer which is liquid at RT. As polybutadiene copolymer which is liquid at RT, for the purposes of the present invention, what is meant is preferably a copolymer of 1,3-butadiene with a further olefin as monomer, either styrene or acrylonitrile. It is generally prepared by copolymerizing 1,3-butadiene with other monomers: styrene or acrylonitrile. Polybutadiene copolymers which are liquid at RT and are to be used with preference in accordance with the invention are therefore styrene-1,3-butadiene copolymers or acrylonitrile-1,3-butadiene copolymers.

The liquid polybutadiene copolymer to be used in accordance with the invention is notable further for the fact that it has a dynamic viscosity, measured by the cone-plate method in analogy to DIN 53019, with a shear rate of 50 1/s, at atmospheric pressure and at a temperature of 25° C., in the range from 100 to 1 000 000 mPas, preferably in the range from 300 to 300 000 mPas, more preferably in the range from 500 to 100 000 mPas, A feature of these polybutadiene copolymers is that they are liquid at room temperature (RT).

In accordance with the invention the polybutadiene copolymer which is liquid at RT is used individually or in combinations of two or more polybutadiene copolymers in the polyamide moulding composition for the polyamide part.

Styrene-1,3-butadiene copolymers to be used as liquid polybutadiene copolymer are also referred to as styrene-butadiene rubber SBR, SBR rubbers are rubbers based on styrene and 1,3-butadiene, including not only solution-SBR rubbers, abbreviated to "SSBR", but also emulsion-SBR rubbers, abbreviated to ESR (J. Schnetger "Lexikon der Kautschuktechnik" [dictionary of rubber technology] 3rd edition, Hüthig Verlag Heidelberg, 2004, pages 505 to 512, F. Röthemeyer, F. Sommer "Kautschuktechnologie" [rubber technology], 2nd revised edition, Carl Hanser Verlag Munich Vienna, 2005, pages 93 to 107, H.-G. Elias, "Macromolecules, Volume 2: Industrial Polymers and Syntheses", WILEY-VCH Verlag GmbH, Weinheim, 2007, pp. 243 to 244, H.-G. Elias, "Macromolecules, Volume 4: Applications of Polymers", WILEY-VCH Verlag GmbH, Weinhelm, 2009, pp. 275 to 275).

Rubbers referred to as S-SBR are produced in a solution process on the basis of styrene and 1,3-butadiene. The amount of copolymerized styrene is preferably in the range from 5 to 50% by weight, more preferably in the range from 10 to 40% by weight. The amount of copolymerized butadiene is preferably in the range from 50 to 95% by weight, more preferably in the range from 50 to 90% by weight. The amount of vinyl groups in the copolymerized butadiene is preferably in the range from 10 to 90 wt %, the amount of 1,4-trans double bonds is preferably in the range from 20 to 80% by weight, and the amount of 1,4-cis double bonds is preferably complementary to the sum of vinyl groups and 1,4-trans double bonds. These styrene-butadiene rubbers are prepared in particular by anionic solution polymerization, i.e. by means of an alkali metal-based or alkaline earth metal-based catalyst in an organic solvent.

The polymerized monomers and the different butadiene configurations are typically distributed randomly in the liquid polybutadiene copolymer. Rubbers having a blockwise structure, which are referred to as integral rubber, are also covered in accordance with the invention by the definition of S-SBR (A) (K.-H. Nordsiek, K. H. Kiepert, G A K Kautschuk Gummi Kunststoffe 33 (1980), no. 4, 251-255).

S-SBR is understood in accordance with the invention to mean both linear and branched or end group-modified rubbers. For example, such types are specified in DE 2 034 989 A1. The branching agent used is preferably silicon tetrachloride or tin tetrachloride.

Rubbers referred to as E-SBR are understood in accordance with the invention to be those prepared by free-radical emulsion polymerization on the basis of styrene and butadiene. The amount of copolymerized styrene is preferably in the range from 15 to 40% by weight. Depending on polymerization temperature, a distinction is made between hot and cold polymerization processes. Initiators used are alkali metal persulfates or organic peroxides with reducing agent.

The acrylonitrile-1,3-butadiene copolymers for alternative use as liquid polybutadiene copolymer are also referred to as acrylonitrile-butadiene rubber NBR. NBR is obtained by free-radical copolymerization of 1,3-butadiene and acrylonitrile in mass ratios of about 50:50 to 85:15. Its preparation takes place in aqueous emulsion. Depending on polymerization temperature, a distinction is made between hot and cold polymerization processes, Initiators used as alkali metal persulfates or organic peroxides with reducing agent (J. Schnetger "Lexikon der Kautschuktechnik" [dictionary of rubber technology] 3rd edition, Hüthig Verlag Heidelberg, 2004, pages 28-29, F, Röthemeyer, F. Sommer "Kautschuktechnologie" [rubber technology], 2nd revised edition, Carl Hanser Verlag Munich Vienna, 2006, pages 107 to 122, H.-G. Elias, "Macromolecules, Volume 2: Industrial Polymers and Syntheses", WILEY-VCH Verlag GmbH, Weinheim, 2007, pp. 244 to 245, H.-G. Elias, "Macromolecules, Volume 4: Applications of Polymers", WILEY-VCH Verlag GmbH, Weinheim, 2009, pp. 275 to 276).

Polybutadiene copolymers which are liquid at room temperature can be produced generally via a synthesis, in other words an increase in the molecular weight, or via a decrease, starting from a polybutadiene copolymer having a higher molecular weight (reduction in molecular weight by mechanical introduction of high shearing forces, preferably in roger mechanisms, also called mastication (J. Schnetger "Lexikon der Kautschuktechnik"[dictionary of rubber technology] 3rd edition, Hüthig Verlag Heidelberg, 2004, pages 1 to 2, F. Röthemeyer, F. Sommer "Kautschuktechnologie" [rubber technology], 2nd revised edition, Carl Hanser Verlag Munich Vienna, 2006, pages, 358 to 360, H.-G. Elias, "Macromolecules, Volume 2: Industrial Polymers and Syntheses", WILEY-VCH Verlag GmbH, Weinheim, 2007, page 262). In terms of synthesis, liquid polybutadiene copolymers for use in accordance with the invention may be prepared as described above via emulsion polymerization processes, Ziegler-Natta polymerization, via anionic polymerization or, in particular for styrene-1,3-butadiene copolymers, via free-radical polymerization in solution (H.-G. Elias "Macromolecules, Volume 2: Industrial Polymers and Syntheses", WILEY-VCH Verlag GmbH, Weinheim, 2007, pp. 242 to 245; H.-G. Elias, "Macromolecules, Volume 4: Applications of Polymers", WILEY-VCH Verlag GmbH, Weinheim, 2007, pp. 284 to 265).

SBRs liquid at RT and for use in accordance with the invention are available for example from Cray Valley USA, LLC, Exton, Pa., USA, in the form of Ricon®, more particularly Ricon® 181, a liquid styrene-1,3-butadiene copolymer having a dynamic viscosity at 25° C. (DIN 53019, cone/plate method, shear rate 50 1/s) of 14 600 mPas (or a Brookfield viscosity in analogy to ISO 2555 of cps 17 500±7500 at 25° C., manufacturer figure) and having a number-average molecular weight Mn in the range around 3200 g/mol (manufacturer figure) (see Cray Valley USA, LLC, Butadiene Styrene Copolymer, Technical Data Sheet, Exton, Pa., USA, 08.2010).

In another preferred embodiment, the at least one polybutadiene copolymer which is liquid at RT is used in combination with at least one polyoctenamer and/or at least one polybutadiene in the polyimide moulding composition. A preferred polyoctenamer used is the 1,8-trans-polyoctenamer. Polybutadiene used preferably comprises polybutadienes having a number-average molecular weight Mn in the range from 800 to 20 000 g/mol and/or having a dynamic viscosity, measured by the cone/plate method in accordance with DIN 53019, under standard pressure and at a temperature of 25° C., in the range from 100 to 15 000 mPas. A feature of these polybutadienes is that they are liquid at room temperature (25° C.).

Coagent

In a preferred embodiment, the polybutadiene copolymer which is liquid at RT in the polyamide component of the inventive composite part is used without additional coagent. Coagents are usually used for the peroxidic crosslinking of rubbers and lead to an increased crosslinking yield. In chemical terms, coagents are polyfunctional compounds which react with polymer free radicals and form more stable free radicals (F. Röthemeyer, F. Sommer "Kautschuktechnologie", 2nd revised edition, Carl Hanser Verlag Munich Vienna, 2006, pages 315 to 317; J. Schnetger "Lexikon der Kautschuktechnik" 3rd edition, Hüthig Verlag Heidelberg, 2004, pages 82 to 83). In a preferred embodiment, it is a feature of the polyamide component of the inventive composite that it does not contain any coagent from the group of ethylene glycol dimethacrylate (EDNA), trim ethoxypropane trimethacrylate (TMPTMA, TRIM), trimethylolpropane triacrylate (TMPTA), hexane-1,6-diol diacrylate (HDDA), hexane-1,6-diol dimethacrylate (HDDMA), butanediol dimethacrylate, zinc diacrylate, zinc dimethacrylate, triallyl cyanurate (TAC), triallyl isocyanurate (TAIC), diallyl terephthalate, triallyl trimellitate (TATM) or N,N'-m-phenylenebismaleimide (MPBM, HVA-2).

Elastomer Part

The rubbers that are to be vulcanized or crosslinked with elemental sulphur and are to be used in the elastomer part of the inventive composite part are elastomers obtainable by a vulcanization process. Vulcanization is understood to mean an industrial chemical process developed by Charles Goodyear, in which rubber is made resistant to atmospheric and chemical influences and to mechanical stress under the influence of time, temperature and pressure and by means of suitable crosslinking chemicals.

According to the prior art, sulphur vulcanization is accomplished by heating a rubber mixture consisting of raw rubber, sulphur in the form of soluble sulphur and/or in the form of insoluble sulphur and/or sulphur-donating substances, which include, for example, the organic additives commonly known as sulphur donors in the rubber industry, and especially disulphur dichloride ($S_2Cl_2$), catalysts, auxiliaries and possibly further fillers. An additive added to the rubber component may be at least one vulcanization accelerator suitable for the sulphur vulcanization.

In the prior art, a distinction is made between five sulphur-based crosslinking systems which differ in the amount of added sulphur or sulphur donor and in the ratio of sulphur or sulphur donor to vulcanization accelerator.

The "conventional" sulphur crosslinking system contains 2.0 to 3.5 phr of sulphur (phr=parts per hundred of rubber, i.e. parts by weight based on 100 parts by weight of rubber) and 0.5 to 1.0 phr of accelerator. In the "semi-EV" crosslinking system (EV=efficient vulcanization), 1.0 to 2.0 phr of sulphur and 1.0 to 2.5 phr of accelerator are used. The "EV" crosslinking system contains 0.3 to 1.0 phr of sulphur and 2.0 to 6.0 phr of accelerator. If 0.3 to 0.6 phr of sulphur, 3.0 to 6.0 phr of accelerator and 0.0 to 2.0 phr of sulphur donor are used, this is referred to as a "low-sulphur EV" crosslinking system. In the fifth sulphur-based crosslinking system, which is not for use in accordance with the invention, the "sulphur donor crosslinking system" does not contain any elemental sulphur (0.0 phr); instead, 0.0 to 2.0 phr of accelerator and 1.0 to 4.0 phr of sulphur donor are used. The sulphur donors which are used in the "sulphur donor crosslinking system" act as vulcanizing agents (F. Röthemeyer, F. Sommer "Kautschuktechnologie", 2nd revised edition, Carl Hanser Verlag Munich Vienna, 2006, pages 291 to 295).

In one embodiment, the elastomer component used in the inventive composite part is a rubber that is to be vulcanized or crosslinked with elemental sulphur as crosslinking agent, in the additional presence of at least one sulphur crosslinking system from the group of conventional sulphur crosslinking system, semi-EV crosslinking system, EV crosslinking system and low-sulphur EV crosslinking system.

In all cases, the crosslinking system may comprise, as well as what are called the main accelerators, different and optionally also a plurality of what are called second accelerators. The nature, dosage and combination thereof is matched to the respective application and is additionally different according to the rubber type. In the vulcanization process with sulphur, the long-chain rubber molecules are crosslinked by sulphur bridges. As a result, the plastic properties of the rubber or rubber mixture are lost, and the material is converted from the plastic to an elastic state by means of the process of vulcanization.

The elastomer that forms in this process of vulcanization, also called vulcanized rubber, has elastomeric properties compared to the reactant, returns to its original state in each case under mechanical stress, and has a higher tear strength, elongation and resistance to ageing and weathering influences.

The elasticity of a sulphur-crosslinked elastomer component depends on the number of sulphur bridges. The more sulphur bridges are present, the harder the vulcanized rubber. The number and length of sulphur bridges is dependent in turn on the amount of sulphur added, the nature of the crosslinking system and the duration of the vulcanization.

The elastomer component which is obtainable from rubber vulcanized or crosslinked with elemental sulphur and is to be used in accordance with the invention in the composite part is notable for the presence of C=C double bonds.

These rubbers containing C=C double bonds are preferably those based on dienes. Particular preference is given in accordance with the invention to rubbers which contain double bonds and, coming from industrial production, have a gel content of less than 30%, preferably less than 5%, especially less than 3%, and are referred to as "R" or "M" rubbers according to DIN/ISO 1629. "Gel content" in the context of the present invention means the proportion of three-dimensionally crosslinked polymeric material that is no longer soluble but is swellable.

Rubbers that are to be crosslinked with elemental sulphur as crosslinking agent and are preferred for the elastomer part in accordance with the invention are those from the group of natural rubber (NR), ethylene-propylene-diene rubbers (EPDMs), styrene/butadiene rubber (SBR), especially E-SBR, polybutadiene rubber (BR), polyisoprene (IR), butyl rubber, especially isobutene/isoprene rubber (OR), halobutyl rubber, especially chloro- or bromobutyl rubber (XIIR), nitrile rubber (NBR), hydrogenated nitrile rubber (H-BR), carboxylated butadiene/acrylonitrile rubber (XNBR) or polychloroprene (CR). If it is possible to obtain rubbers by more than one synthesis route, for example from emulsion or from solution, in accordance with the invention all options are always meant. The aforementioned rubbers are sufficiently well known to those skilled in the art and are commercially available from a wide variety of different suppliers.

In addition, it is also possible to use mixtures of two or more of the aforementioned rubbers in the elastomer part of the inventive composite. These mixtures are also referred to as polymer blends of rubbers or as rubber blends (J. Schnetger "Lexikon der Kautschuktechnik" 3rd edition, Hüthig Verlag Heidelberg, 2004, pages 375 to 377). Rubber blends for use with preference in the elastomer part of the inventive composite are mixtures of NR as matrix phase and BR as dispersed rubber phase with BR contents up to 50 phr and of BR as matrix phase and SBR or CR as dispersed rubber phase with SBR or CR contents up to 50 phr.

Especial preference is given in accordance with the invention to using at least natural rubber (NR) (CAS No. 9006-04-6) as rubber to be vulcanized or crosslinked with elemental sulphur for the elastomer part.

The natural rubber (NR) which is to be crosslinked with elemental sulphur and is especially preferred in accordance with the invention for the elastomer part in the inventive composite. In chemical terms, is a polyisoprene having a cis-1,4 content of >99% with mean molecular weights of $2 \cdot 10^6$ to $3 \cdot 10^7$ g/mol. NR is synthesized by a biochemical route, preferably in the plantation plant Hevea Brasiliensis, Natural rubbers are commercially available, for example, as products from the SMR product series (Standard Malaysian Rubber) from Pacidunia Sdn. Bhd., or from the SVR product series (Standard Vietnamese Rubber) from Phu An Imexco, Ltd. (J. Schnetger "Lexikon der Kautschuktechnik" 3rd edition, Hüthig Verlag Heidelberg, 2004, pages 331 to 338).

In an alternatively preferred embodiment, the rubber which is to be crosslinked with elemental sulphur and is used for the elastomer part in the inventive composite is EPDM rubber (CAS No. 25038-36-2). EPDM comprises polymers which are prepared by terpolymerization of ethylene and greater proportions of propylene, and also a few % by weight of a third monomer having diene structure. The diene monomer provides the double bonds for the vulcanization that follows. Diane monomers used are predominantly cis, cis-1,5-cyclooctadiene (COD), exo-dicyclopentadiene (DCP), endo-dicyclopentadiene (EDCP), 1,4-hexadiene (HX), 5-ethylidene-2-norbornene (ENB) and also vinylnorbornene (VNB).

EPDM rubber is prepared in a known manner by polymerizing a mixture of ethene and propene and a diene in the presence of Ziegler-Natta catalyst systems, for example vanadium compounds with organoaluminium cocatalysts, ear metallocene catalyst systems (J. Schnetger "Lexikon der Kautschuktechnik" 3rd edition, Hüthig Verlag Heidelberg, 2004, pages 144 to 146). In general, a mixture of more than 25% by weight of ethene, more than 25% by weight of propene and 1% to 10% by weight, preferably 1% to 3% by weight, of a nonconjugated diene such as bicyclo[2.2.1] heptadiene, 1,5-hexadiene, dicyclopentadiene, 5-ethylidenenorbornene and also vinylnorbornene (VNB) is polymerized.

EPDM rubbers for the elastomer part are obtainable, for example, as products from the product series of the Keltan® brand from Lanxess Deutschland GmbH, or else by the methods familiar to the person skilled in the art.

Employed as rubber to be crosslinked with elemental sulphur for the elastomer part, in an alternative preferred embodiment, is styrene-butadiene rubber SBR (CAS No. 9003-55-8) for the elastomer part in the composite of the invention. SBR rubbers are rubbers based on styrene and 1,3-butadiene, including both solution-SBR rubbers, abbreviated to "S-SBR", and emulsion-SBR rubbers, abbreviated to E-SBR (J. Schnetger "Lexikon der Kautschuktechnik" [dictionary of rubber technology] 3rd edition, Hüthig Verlag Heidelberg, 2004, pages 508 to 512, F. Röthemeyer, F. Sommer "Kautschuktechnologie" [rubber technology], 2nd revised edition, Carl Hanser Verlag Munich Vienna, 2006, pages 93 to 107, H.-G. Elias, "Macromolecules, Volume 2: Industrial Polymers and Syntheses", WILEY-VCH Verlag GmbH, Weinheim, 2007, pp. 243 to 244, H. G. Elias, "Macromolecules, Volume 4: Applications of Polymers", WILEY-VCH Verlag GmbH, Weinheim, 2009, pp. 275 to 278).

S-SBR for the elastomer part is understood to comprise rubbers which are prepared in a solution process on the basis of styrene and 1,3-butadiene. The amount of copolymerized styrene is preferably in the range from 5 to 50% by weight, more preferably in the range from 10 to 40% by weight. The amount of copolymerized butadiene is preferably in the range from 50 to 95% by weight, more preferably in the range from 60 to 90% by weight. The amount of vinyl groups in the copolymerized butadiene is preferably in the range from 10 to 90% by weight, the amount of 1,4-trans double bonds is preferably in the range from 20 to 80% by weight and the amount of 1,4-cis double bonds is complementary to the sum of vinyl groups and 1,4-trans double bonds. These styrene-butadiene rubbers are prepared in particular by anionic solution polymerization, i.e. by means of an alkali metal-based or alkaline earth metal-based catalyst in an organic solvent.

Customarily the polymerized monomers and the various butadiene configurations are distributed randomly in the polymer for the elastomer part. Rubbers with a structure of block-like construction, referred to as integral rubber, are intended in accordance with the invention to be included by the definition of S-SBR (A) (K.-H. Nordsiek, K.-H. Kiepert, G A K Kautschuk Gummi Kunststoffe 33 (1980), No. 4, 251-255).

S-SBR for the elastomer part is intended in accordance with the invention to comprehend both linear and branched or end-group-modified rubbers. Grades of these kinds are identified for example in DE 2 034 989 A1. Silicon tetrachloride or tin tetrachloride is employed with preference as branching agent.

E-SBR for the elastomer part is understood to comprise rubbers prepared by free-radical emulsion polymerization on the basis of styrene and butadiene. The amount of copolymerized styrene is preferably in the range from 15 to 40% by weight. Depending on polymerization temperature, a distinction is made between hot and cold polymerization processes. Initiators used as alkali metal persulfates or organic peroxides with reducing agent. The emulsions resulting from the polymerization procedure are worked up to the solid rubber for use.

Both E-SBR and S-SBR can also be used in oil-extended form in the elastomer components for the elastomer part in the inventive composite. "Oil-extended" in the context of the present invention means that boils have been mixed into the rubber in the production process. The oils serve as plasticizers. The oils that are customary in industry and are known to those skilled in the art are employed here. Preference is given to those containing a low level, if any, of polyaromatic hydrocarbons, TDAE (treated distillate aromatic extract), MES (mild extraction solvate) and naphthenic oils are suitable.

In an alternative preferred embodiment, the rubber which is to be crosslinked with elemental sulphur and is used for the elastomer part in the inventive composite is polybutadiene (BR) (CAS No. 9003-17-2). Polybutadiene (BR) comprises two different classes of polybutadiene in particular. The first class has a 1,4-cis content of at least 90% and is prepared with the aid of Ziegler/Natta catalysts based on transition metals. Preference is given to using catalyst systems based on Ti, Ni, Co and Nd (Houben-Weyl, Methoden der Organischen Chemie, Thieme Verlag, Stuttgart, 1987, volume E 20, pages 798 to 812; Ullmann's Encyclopedia of Industrial Chemistry, Vol A 23, Rubber 3. Synthetic, VCH Verlagsgesellschaft mbH, D-69451 Weinheim, 1993, p. 239-364). The glass transition temperature of these polybutadienes is preferably ≤−90° C. (determined by means of DSC).

The second polybutadiene class is prepared with lithium catalysts and has vinyl contents of 10% to 80%. The glass transition temperatures of these polybutadiene rubbers are in the range from −90° C. to +20° C. (determined by means of DSC).

In an alternative preferred embodiment, the rubber which is to be crosslinked with elemental sulphur and is used for the elastomer part in the inventive composite is polyisoprene (IR). Polyisoprene (CAS No. 9003-31-0) or isoprene rubber is the synthetic produced variant of natural rubber. It differs from the latter primarily in the lower chemical purity. The reason for this is that the catalysts used for the polymerization possess a lower efficiency than the enzymes which occur in nature. The purity of natural rubber (NR) is more than 99.9%, whereas only about 92-97% is achieved in the case of the synthetically produced depending on the catalyst employed. Polyisoprene (IR) typically has a 1,4-cis content of at least 70%. IR is produced synthetically both by means of lithium catalysts and with the aid of Ziegler/Natta catalysts, preferably with titanium and neodymium catalysts (Houben-Weyl, Methoden der Organischen Chemie, Thieme Verlag, Stuttgart, 1987, volume E 20, pages 822 to 840; Ullmann's Encyclopedia of Industrial Chemist Vol A 23, Rubber 3. Synthetic, VCH Verlagsgesellschaft mbH, D-69451 Weinheim, 1993, p. 239-364).

3,4-Polyisoprene, which has glass transition temperatures in the range from −20 to +3° C., is also covered by IR.

In an alternative preferred embodiment, the rubber which is to be crosslinked with elemental sulphur and is used for the elastomer part in the inventive composite is acrylonitrile-butadiene rubber (NBA). NBA (CAS No. 9003-18-3) is obtained by free-radical copolymerization of 1,3-butadiene and acrylonitrile in mass ratios of about 50:50 to 85:15. It is prepared in aqueous emulsion. Depending on polymerization temperature, a distinction is made between hot and cold polymerization processes. Initiators used are alkali metal persulfates or organic peroxides with reducing agent. The emulsions resulting from the polymerization procedure are worked up to the solid rubber for use (J. Schnetger "Lexikon der Kautschuktechnik" [dictionary of rubber technology] 3rd edition, Hüthig Verlag Heidelberg, 2004, pages 28-29, F. Röthemeyer, F. Sommer "Kautschuktechnologie" [rubber technology], 2nd revised edition, Carl Hanser Verlag Munich Vienna, 2006, pages 107 to 122, H.-G. Elias, "Macromolecules, Volume 2: Industrial Polymers and Syntheses", WILEY-VCH Verlag GmbH, Weinheim, 2007, pp. 244 to 244, H.-G. Elias, "Macromolecules, Volume 4: Applications of Polymers", WILEY-VCH Verlag GmbH, Weinheim, 2009, pp. 275 to 278).

In an alternative preferred embodiment, the rubber which is to be crosslinked with elemental sulphur and is used for the elastomer part in the inventive composite is hydrogenated nitrile rubber (H-NBA). H-NBA (CAS No. 308068-83-9) is produced via complete or partial hydrogenation of NBR in nonaqueous solution using specific catalysts (e.g. pyridine-cobalt complexes or rhodium, ruthenium, iridium or palladium complexes) (J. Schnetger "Lexikon der Kautschuktechnik" 3rd edition, Hüthig Verlag Heidelberg, 2004, page 30).

In an alternative preferred embodiment, the rubber which is to be crosslinked with elemental sulphur and is used for the elastomer part in the inventive composite is carboxylated butadiene/acrylonitrile rubber (XNBR), XNBR is produced via terpolymerization of butadiene, acrylonitrile and acrylic acid or methacrylic acid. The proportion of the carboxylic acid is in the range from 1% to 7% by weight (F. Röthemeyer, F. Sommer "Kautschuktechnologie", 2nd revised edition, Carl Hanser Verlag Munich Vienna, 2006, page 112), XNBR is available for example from Lanxess Deutschland GmbH, Cologne, as Krynac® X740.

In an alternative preferred embodiment, the rubber which is to be crosslinked with elemental sulphur and is used for the elastomer part in the inventive composite is butyl rubber (IIR), especially isobutene/isoprene rubber (CAS No. 9010-85-9). Butyl rubber is produced via a copolymerization of isoprene and isobutylene (J. Schnetger "Lexikon der Kautschuktechnik"3rd edition, Hüthig Verlag Heidelberg, 2004, pages 69 to 71).

In an alternative preferred embodiment, the rubber which is to be crosslinked with elemental sulphur and is used for the elastomer part in the inventive composite is halobutyl rubber (XIIR), especially chlorobutyl rubber (CIIR) or bromobutyl rubber (BIIR), (CAS No. 68441-14-5). Chlorobutyl rubber (CIIR) (CAS No. 68081-82-3) is produced by introducing chlorine gas into a butyl rubber solution (J. Schnetger "Lexikon der Kautschuktechnik" 3rd edition, Hüthig Verlag Heidelberg, 2004, page 75). Bromobutyl rubber (BIIR) is produced by treating butyl rubber in solution with bromine (J. Schnetger "Lexikon der Kautschuktechnik" 3rd edition, Hüthig Verlag Heidelberg, 2004, pages 66 to 67).

In an alternative preferred embodiment, the rubber which is to be crosslinked with elemental sulphur and is used for the elastomer part in the inventive composite is polychloroprene (CR). Polychloroprene (CAS No. 9010-98-4) is prepared from chloroprene (2-chloro-1,3-butadiene), optionally in the presence of dichlorobutadiene or sulphur as comonomers, in an emulsion polymerization. Through use of specific chain transfer agents, such as mercaptans, for example n-dodecyl mercaptan, or xanthogen disulphide, during the polymerization, it is possible to produce what are called mercaptan CR types or xanthogen disulphide CR types, which can be crosslinked with metal oxides, vulcanization accelerators and sulphur. It is possible here to use specific accelerator systems, especially thioureas (ETU, DBTU, TBTU, DETU, MTT) (J. Schnetger "Lexikon der Kautschuktechnik" 3rd edition, Hüthig Verlag Heidelberg, 2004, pages 76 to 81; F. Röthemeyer, F. Sommer "Kautschuktechnologie", 2nd revised edition, Carl Hanser Verlag Munich Vienna, 2006, pages 15 to 163).

Preferably, the rubber which is to be crosslinked with elemental sulphur and is used for the elastomer part in the inventive composite is at least one from the group of natural rubber (NR), ethylene-propylene-diene rubbers (EPDMs), styrene/butadiene rubber (SBR), especially E-SBR, polybutadiene rubber (BR), polyisoprene (IR) butyl rubber, especially isobutene/isoprene rubber (IIR), halobutyl rubber (XIIR), especially chloro- or bromobutyl rubber, acrylonitrile-butadiene rubber (NBR), hydrogenated nitrile rubber (H-NBR), carboxylated butadiene/acrylonitrile rubber (XNBR) and polychloroprene (CR), or mixtures of two or more of the aforementioned rubbers.

More preferably, the rubber which is to be crosslinked with elemental sulphur and is used for the elastomer part in the inventive composite is at least one rubber from the group of natural rubber (NR), ethylene-propylene-diene rubber (EPDM), styrene/butadiene rubber (SBR), carboxylated butadiene/acrylonitrile rubber (XNBR), polychloroprene (CR), nitrile rubber (NBA) and polybutadiene (BR), or mixtures of two or more of the aforementioned rubbers.

Most preferably, the rubber which is to be crosslinked with elemental sulphur and is used for the elastomer part in the inventive composite is at least one from the group of natural rubber (CR), ethylene-propylene-diene rubber (EPDM), styrene/butadiene rubber (SBR), carboxylated butadiene/acrylonitrile rubber (XNBR) and polybutadiene (BR), or mixtures of two or more of the aforementioned rubbers.

In a very particularly preferred embodiment of the present invention, the rubber which is to be crosslinked with elemental sulphur and is used for the elastomer part in the inventive composite is natural rubber (NR).

In a very particularly preferred embodiment of the present invention, the rubber which is to be crosslinked with elemental sulphur and is used for the elastomer part in the inventive composite is ethylene-propylene-diene rubber (EPDM).

In a very particularly preferred embodiment of the present invention, the rubber which is to be crosslinked with elemental sulphur and is used for the elastomer part in the inventive composite is styrene/butadiene rubber (SBR).

In a very particularly preferred embodiment of the present invention, the rubber which is to be crosslinked with elemental sulphur and is used for the elastomer part in the inventive composite is polybutadiene (BR).

In a very particularly preferred embodiment of the present invention, the rubber which is to be crosslinked with elemental sulphur and is used for the elastomer part in the inventive composite is polyisoprene (IR).

In a very particularly preferred embodiment of the present invention, the rubber which is to be crosslinked with elemental sulphur and is used for the elastomer part in the inventive composite is butyl rubber (IIR).

In a very particularly preferred embodiment of the present invention, the rubber which is to be crosslinked with elemental sulphur and is used for the elastomer part in the inventive composite is halobutyl rubber (XIIR).

In a very particularly preferred embodiment of the present invention, the rubber which is to be crosslinked with elemental sulphur and is used for the elastomer part in the inventive composite is nitrile rubber (NBR).

In a very particularly preferred embodiment of the present invention, the rubber which is to be crosslinked with elemental sulphur and is used for the elastomer part in the inventive composite is hydrogenated nitrile rubber (H-NBR).

In a very particularly preferred embodiment of the present invention, the rubber which is to be crosslinked with elemental sulphur and is used for the elastomer part in the inventive composite is carboxylated butadiene/acrylonitrile rubber (XNBR).

In a very particularly preferred embodiment of the present invention, the rubber which is to be crosslinked with elemental sulphur and is used for the elastomer part in the inventive composite is polychloroprene (CR).

In one embodiment of the present invention, the rubbers for use for the elastomer part are in unfunctionalized form. In alternative embodiments of the present invention, the bond strength may be improved further when the rubber is functionalized, especially by introduction of hydroxyl groups, carboxyl groups or acid anhydride groups.

Elemental Sulphur

According to the invention, the crosslinker/vulcanizer added to the rubber for the elastomer part in the inventive composite is elemental sulphur (CAS No. 7704-34-9). This is used in the form of either soluble or insoluble sulphur, preferably in the form of soluble sulphur.

Soluble sulphur is understood to mean the only form which is stable at normal temperatures, yellow cyclooctasulphur, also referred to as $S_B$ sulphur or α-sulphur, which consists of typical rhombic crystals and has solubility in carbon disulphide. For instance, at 25° C., 30 g of α-S dissolve in 100 g of $CS_2$ (see "Schwefel" [Sulphur] in the online Römpp Chemie Lexikon, August 2004 version, Georg Thieme Verlag Stuttgart).

Insoluble sulphur is understood to mean a sulphur polymorph which does not have a tendency to exude at the surface of rubber mixtures. This specific sulphur polymorph is insoluble to an extent of 60%-95% in carbon disulphide.

In an alternative preferred embodiment, in addition to elemental sulphur, at least one so-called sulphur donor is added to the rubber for the elastomer part of the inventive composite. These sulphur donors for additional use may or may not have accelerator action in relation to the vulcanization. Sulphur donors lacking accelerator action for use with preference are dithiomorpholine (DTDM) or caprolactam disulphide (CLD). Sulphur donors having accelerator action for use with preference are 2-(4-morpholinodithio) benzothiazole (MBSS), tetramethylthiuram disulphide (TMTD), tetramethylthiuram disulphide (TETD) or dipentamethylenethiuram tetrasulphide (DPTT) (J. Schnetger "Lexikon der Kautschuktechnik" 3rd edition, Hüthig Verlag Heidelberg, 2004, page 472 or F. Röthemeyer, F. Sommer "Kautschuktechnologie", 2nd revised edition, Carl Hanser Verlag Munich Vienna, 2006, pages 309 to 310).

Elemental sulphur and sulphur donors that are optionally to be used additionally in preferred embodiments are used in the rubber mixture for use for the elastomer part in the inventive composite preferably in a total amount in the range from 0.1 to 15 parts by weight, more preferably 0.1 to 10 parts by weight, based on 100 parts by weight of the rubber for the elastomer component.

If two or more rubbers are used as elastomer component in the elastomer part of the inventive composite, the sum total of all the rubbers serves as the basis for the aforementioned figures in parts by weight. This also applies hereinafter to all the other amounts stated for the other components of an elastomer component for use in accordance with the invention for production of an inventive composite.

In one embodiment which is preferred in accordance with the invention, at least one vulcanization accelerator suitable for sulphur vulcanization with elemental sulphur can be added as an additive to the rubber in the elastomer part of the inventive composite.

Corresponding vulcanization accelerators are mentioned in J. Schnetger "Lexikon der Kautschuktechnik", 3rd edition, Hüthig Verlag Heidelberg, 2004, pages 514-515, 537-539 and 558-589.

Vulcanization accelerators preferred in accordance with the invention are xanthogenates, dithiocarbamates, tetramethylthiuram disulphides, thiurams, thiazoles, thiourea derivatives, amine derivatives such as tetramines, sulphenimides, piperazines, amine carbamates, sulphenimides, dithiophosphoric acid derivatives, bisphenol derivatives or triazine derivatives.

Vulcanization accelerators particularly preferred in accordance with the invention are benzothiazyl-2-cyclohexylsulphenamide (CBS), benzothiazyl-2-tert-butylsulphenamide (TBBS), benzothiazyl-2-dicyclohexylsulphenamide (DCBS), 1,3-diethylthiourea (DETU), 2-mercaptobenzothiazole (MBT) and zinc salts thereof (ZMBT), copper dimethyldithiocarbamate (CDMC), benzothiazyl-2-sulphene morpholide (MBS), benzothiazyldicyclohexylsulphenamide (DCBS), 2-mercaptobenzothiazole disulphide (MBTS), dimethyldiphenylthiuram disulphide (MPTD), tetrabenzylthiuram disulphide (TBZTD), tetramethylthiuram monosulphide (TMTM), dipentamethylenethiuram tetrasulphide (DPTT), tetraisobutylthiuram disulphide (IBTD), tetraethylthiuram disulphide (TETD), tetramethylthiuram disulphide (TMTD), zinc N-dimethyldithiocarbamate (ZDMC), zinc N-dimethyldithiocarbamate (ZDEC), zinc N-dibutyl dithiocarbamate (ZDBC), zinc N-ethylphenyldithiocarbamate (ZEBC), zinc dibenzyldithiocarbamate (ZBEC), zinc diisobutyldithiocarbamate (ZDiBC), zinc N-pentamethylenedithiocarbamate (ZPMC), zinc N-ethylphenyldithiocarbamate (ZEPC), zinc 2-mercaptobenzothiazole (ZMBT), ethylenethiourea (ETU), tellurium diethyldlthiocarbamate (TDEC), diethylthiourea (DETU), N,N-ethylenethiourea (ETU), diphenylthiourea (DPTU), triethyltrimethyltriamine (TTT); N-t-butyl-2-benzothiazolesulphenimide (TBSI); 1,1'-dithiobis(4-methylpiperazine); hexamethylenediamine carbamate (HMDAC); benzothiazyl-2-tert-butylsulphenamide (TOBS), N,N'-diethylthiocarbamyl-N'-cyclohexylsulphenamide (DETCS), N-oxydiethylenedithiocarbamyl-N'-oxydiethylenesulphenamide (OTOS), 4,4'-dihydroxydiphenyl sulphone (Bisphenol 3), zinc isopropylxanthogenate (ZIX), selenium salts, tellurium salts, lead salts, copper salts and alkaline earth metal salts of dithiocarbamic acids; pentamethyleneammonium N-pentamethylenedithiocarbamate; dithiophosphoric acid derivatives; cyclohexylethylamine; dibutylamine; polyethylenepolyamines or polyethylenepolyimines, especially triethylenetetramine (TETA).

The vulcanization accelerators are preferably used in an amount in the range of 0.1 to 15 parts by weight, more preferably in an amount in the range from 0.1 to 10 parts by weight, based on 100 parts by weight of the rubber for the elastomer component in the elastomer part of the inventive composite.

In one embodiment preferred in accordance with the invention, zinc oxide and stearic acid or zinc oxide and 2-ethylhexanoic acid or zinc stearate is added as additive to the rubber in the elastomer component of the elastomer part of the inventive composite. Zinc oxide is used as an activator for the sulphur vulcanization. The selection of a suitable amount is possible for the person skilled in the art without any great difficulty. If the zinc oxide is used in a somewhat higher dosage, this leads to increased formation of monosulphidic bonds and hence to an improvement in ageing resistance of the rubber component. In the case of use of zinc oxide, the inventive rubber component further comprises stearic acid (octadecanoic acid). This is known by the person skilled in the art to have a broad spectrum of action in rubber technology. For instance, one of its effects is that it leads to improved dispersion of the vulcanization accelerators in the elastomer component. In addition, complex formation occurs with zinc ions in the course of sulphur vulcanization. As an alternative to stearic acid, it is also possible to use 2-ethylhexanoic acid.

Preferably, zinc oxide (CAS No. 1314-13-2) is used in an amount in the range of from 0.5 to 15 parts by weight, more preferably in an amount in the range from 1 to 7.5 parts by weight, very especially preferably in an amount in the range from 1 to 5 parts by weight, based on 100 parts by weight of the rubber in the elastomer component of the elastomer part.

Preferably, stearic acid (CAS No. 57-114) or 2-ethylhexanoic acid (CAS No. 149-57-5) is used in an amount in the range from 0.1 to 7 parts by weight, more preferably in an amount in the range from 0.25 to 7 parts by weight, very especially preferably in an amount in the range from 0.5 to 5 parts by weight, based on 100 parts by weight of the rubber in the elastomer component of the elastomer part.

Alternatively or else additionally to the combination of zinc oxide and stearic acid, in a preferred embodiment, zinc stearate (CAS No. 557-051) may be used. In this case, typically an amount in the range from 0.25 to 5 parts by weight, more preferably an amount in the range from 1 to 3 parts by weight, based in each case on 100 parts by weight of the rubber in the elastomer component of the elastomer part, is used. As an alternative to zinc stearate, it is also possible to use the zinc salt of 2-ethylhexanoic acid.

In an alternative preferred embodiment, as well as with elemental sulphur, the crosslinking of the at least one rubber in the elastomer component of the elastomer part of the inventive composite can also be conducted as a mixed sulphur/peroxide crosslinking.

In addition, the elastomer component for the elastomer part in the inventive composite, in a preferred embodiment, comprises at least one further component from the group of fillers, masticating agents, plasticizers, processing active ingredients, ageing, UV or ozone stabilizers, tackifiers, pigments or dyes, blowing agents, flame retardants, mould release agents, strengthening elements and bonding systems.

In the case of use of fillers in the elastomer component for the elastomer part in the inventive composite, preference is given to using at least one filler from the group of silica, carbon black, silicates, oxides or organic fillers, in particular silica and/or carbon black.

"Silica" (CAS No, 7631-86-9) (Ullmann's Encyclopedia of Industrial Chemistry, VCH Verlagsgesellschaft mbH, D-69451 Weinheim, 1993, "Silica", p. 635-845) is especially used in the form of fumed silica (ibid. p. 635-642) or of precipitated silica (ibid. 642-645), preference being given in accordance with the invention to precipitated silica. Precipitated silicas have a specific surface area of 5 to 1000 $m^2/g$ determined to BET, preferably a specific surface area of 20 to 400 $m^2/g$. They are obtained by treatment of waterglass with inorganic acids, preference being given to using sulphuric acid. In one embodiment, the silicas may also be in the form of mixed oxides with other metal oxides, such as oxides of Al, Mg, Ca, Ba, Zn, Zr, Ti. Preference is given in accordance with the invention to using silicas having specific surface areas of 5 to 1000 m²/g, more preferably of 20 to 400 m²/g, determined in each case to BET analogous to DIN ISO 9277:2003-05.

The carbon blacks (CAS No. 1333-36-4) for use in one embodiment as fillers in the elastomer component for the elastomer part in the inventive composite are likewise known to those skilled in the art (see "carbon" or "carbon black" entries in Ullmann's Encyclopedia of Industrial Chemistry, VCH Verlagsgesellschaft mbH, D-69451 Weinheim, 1993, vol. A 5, p. 95-158). They are preferably produced by the gas black, furnace black, lamp black and thermal black processes and are classified according to the new ASTM nomenclature (ASTM D 1765 and D 2516) as N 110, N 115, N 121, N 125, N 212, N 220, N 231, N 234, N 242, N 293, N 299, S 315, N 326, N 330, N 332, N 339, N 343, N 347, N 351, N 375, N 472, N 539, N 550, N 582, N 630, N 642, N 650, N 660, N 683, N 754, N 762, N 765, N 772, N 774, N 767, N 907, N 908, N 990, N 991 S 3 etc. Carbon blacks for use as filler preferably have BET surface areas in the range from 5 to 200 m²/g, determined analogously to DIN ISO 9277:2003-05.

Preferred further fillers which may be used in the elastomer component for the elastomer part in the inventive composite are those from the group of the synthetic silicates, especially aluminium silicate, the alkaline earth metal silicates, especially magnesium silicate or calcium silicate, preferably in each case having BET surface areas determined in analogy to DIN ISO 9277:2003-05 in the range from 20 to 400 m²/g and primary particle diameters in the range from 5 to 400 nm, natural silicates, especially kaolin or kieselguhr and other naturally occurring silicas, the metal oxides, especially aluminium oxide, magnesium oxide, calcium oxide, the metal carbonates, especially calcium carbonate, magnesium carbonate, zinc carbonate, the metal sulphates, especially calcium sulphate, barium sulphate, the metal hydroxides, especially aluminium hydroxide or magnesium hydroxide, the glass fibres or glass fibre products (bars, strands or glass microbeads), the thermoplastics, especially polyamide, polyester, aramid, polycarbonate, syndiotactic 1,2-polybutadiene or trans-1,4-polybutadiene, and cellulose, cellulose derivatives or starch.

In the case of use of additional masticating agents in the elastomer component for the elastomer part in the inventive composite, preference is given to using at least one masticating agent from the group of thiophenols, thiophenol zinc salts, substituted aromatic disulphides, peroxides, thiocarboxylic acid derivatives, nitroso compounds, hydrazine derivatives, Porofors (blowing agents) or metal complexes, especially iron hemiporphyrazine, iron phthalocyanine, iron acetonylacetate or the zinc salt thereof (J. Schnetger "Lexikon der Kautschuklechnik" 3rd edition, Hüthig Verlag Heidelberg, 2004, pages 1 to 2). The way in which the masticating agents work is described in EP 0 603 611 A1.

In the case of use of additional plasticizers in the elastomer component for the elastomer part in the inventive composite, preference is given to using at least one plasticizer from the group of paraffinic mineral oils, naphthenic mineral oils, aromatic mineral oils, aliphatic esters, aromatic esters, polyesters, phosphates, ethers, thioethers, natural fats or natural oils (F. Röthemeyer, F. Sommer "Kautschuktechnologie", 2nd revised edition, Carl Hanger Verlag Munich Vienna, 2006, pages 329 to 337).

In the case of use of additional processing active ingredients in the elastomer component for the elastomer part in the inventive composite, preference is given to using at least one processing active ingredient from the group of fatty acids, fatty acid derivatives, fatty acid esters, fatty alcohols and factice (F. Röthemeyer, F. Sommer "Kautschuktechnologie", 2nd revised edition, Carl Hanser Verlag Munich Vienna, 2006, pages 337 to 338). Factice, also known as oil rubber, is a rubber-like material which arises through cross-linking of unsaturated mineral oils and vegetable oils, in Europe particularly of rapeseed oil, colza oil or castor oil, and in America additionally of soya oil. In this regard, see also: http://de.wikipedia.org/wiki/Faktis.

In the case of use of additional ageing, UV and ozone stabilizers in the elastomer component of the elastomer part in the composite part, preference is given to using at least one ageing, UV and ozone stabilizer from the group of UV stabilizers, especially carbon black unless it is already being used as a filler—or titanium dioxide, antiozonant waxes, additives that break down hydroperoxides (tris(nonylphenyl) phosphite), heavy metal stabilizers, substituted phenols, diarylamines, substituted p-phenylenediamines, heterocyclic mercapto compounds, paraffin waxes, microcrystalline waxes and para-phenylenediamines (F. Röthemeyer, F. Sommer "Kautschuktechnologie", 2nd revised edition, Carl Hanser Verlag Munich Vienna, 2006, pages 338 to 344).

In the case of use of additional tackifier resins in the elastomer component of the elastomer part in the composite part, preference is given to using at least one tackifier resin from the group of natural resin, hydrocarbon resin and phenol resin (F. Röthemeyer, F. Sommer "Kautschuktechnologie", 2nd revised edition, Carl Hanser Verlag Munich Vienna, 2006, pages 345 to 346).

In the case of use of additional pigments and dyes in the elastomer component of the elastomer part in the inventive composite, preference is given to using at least one pigment or dye from the group of titanium dioxide unless it is already being used as a UV stabilizer lithopone, zinc oxide, iron oxide, ultramarine blue, chromium oxide, antimony sulphide and organic dyes (F. Röthemeyer, F. Sommer "Kautschuktechnologie", 2nd revised edition, Carl Hanser Verlag Munich Vienna, 2006, page 346).

In the case of use of additional blowing agents in the elastomer component of the elastomer part in the inventive composite, preference is given to using at least one blowing agent from the group of benzenesulphohydrazide, dinitrosopentamethylenetetramine and azodicarbonamide (F. Röthemeyer, F. Sommer "Kautschuktechnologie", 2nd revised edition, Carl Hanser Verlag Munich Vienna, 2006, page 346).

In the case of use of additional flame retardants in the elastomer component of the elastomer part in the inventive composite, preference is given to using at least one flame retardant from the group of aluminium oxide hydrate, halogenated flame retardants and phosphorus flame retardants (F. Röthemeyer, F. Sommer "Kautschuktechnologie", 2nd revised edition, Carl Hanser Verlag Munich Vienna, 2006, page 346).

In the case of use of mould release agents in the elastomer component of the elastomer part in the inventive composite, preference is given to using at least one mould release agent from the group of saturated and partly unsaturated fatty acids and oleic acids and derivatives thereof, especially fatty acid esters, fatty acid salts, fatty alcohols and fatty acid amides. In the case of application of the mould release agents to the mould surface, it is possible with preference to use products based on low molecular weight silicone compounds, products based on fluoropolymers and products based on phenol resins.

In the case of use of strengthening elements (fibres) in the elastomer component of the elastomer part in the inventive composite for strengthening the vulcanizates, preference is given to using at least one strengthening element in the form of fibres based on glass, according to U.S. Pat. No. 4,826,721, or cord, woven fabric, fibres of aliphatic or aromatic polyamides (Nylon®, Aramide®), of polyesters or of natural fibre products. It is possible to use either staple fibres or continuous fibres (J. Schnetger "Lexikon der Kautschuktechnik" 3rd edition, Hüthig Verlag Heidelberg, 2004, pages 498 and 528). An illustrative list of strengthening elements customary in the rubber industry can be found, for example, in F. Röthemeyer, F. Sommer "Kautschuktechnologie", 2nd revised edition, Carl Hanser Verlag Munich Vienna, 2006, pages 823 to 827.

Manifestations of the elastomer component of the elastomer part in the inventive composite that are included within the scope of the invention are foamed vulcanizates, cellular rubber or else foam rubber (J. Schnetger "Lexikon der Kautschuktechnik" 3rd edition, Hüthig Verlag Heidelberg, 2004, pages 322 to 323 and 618). Foamed vulcanizates are preferably produced with the aid of blowing agents.

Preferably, the elastomer component of the elastomer part in the inventive composite which is to be crosslinked with sulphur and is to be used for the inventive shaping method is processed from at least one rubber, sulphur and optionally further constituents by means of the operation of what is called mixture processing with the aid of an internal mixer or a roll mill to give a vulcanizable rubber mixture, and hence prepared for the actual shaping method. In this mixture processing operation, the constituents of the rubber mixtures for the elastomer component are mixed intimately with one another. In principle, the mixture can be produced batchwise by means of an internal mixer or roll mill, or continuously by means of extruders (J. Schnetger "Lexikon der Kautschuktechnik" 3rd edition, Hüthig Verlag Heidelberg, 2004, pages 275 and 315 to 318).

Polyamide Component

The polyamide for use for the polyamide component of the inventive composite is preferably prepared from a combination of diamine and dicarboxylic acid, from an ω-aminocarboxylic acid or from a lectern. Polyamides for use with preference are PA6, PA66, PA610 (CAS No. 9011-52-3), PA88, PA612 (CAS No. 26098-55-5), PA810, PA108, PA9, PA613, PA614, PA812, PA1010, PA10, PA614, PA148, PA1012, PA11 (CAS No. 25035-04-5), PA1014, PA1212 or PA12 (CAS No. 29437-16-4). Particular preference is given in accordance with the invention to using the polyamide moulding composition PM or PAN (CAS No. 32131-17-2) for use in the 2-component injection moulding operation, especially PM (CAS No. 25038-54-4). The preparation of the polyamides is prior art. It will be appreciated that it is also possible to use copolyamides based on the abovementioned polyamides.

A multitude of procedures for preparation of polyamides have become known, with use, depending on the desired end product, of different monomer units, different chain transfer agents to establish a desired molecular weight, or else monomers with reactive groups for aftertreatments intended at a later stage. The methods of industrial relevance for preparation of the polyamide component for use in the inventive composite proceed preferably via polycondensation in the melt or via polyaddition of appropriate lactams. The polyaddition reactions of lactams include hydrolytic, alkaline, activated anionic and cationic lectern polymerization. The preparation of polyamides by thermal polycondensation and by lactam polymerization is known to those skilled in the art; see, inter alia, Nylon Plastics Handbook, Hanser-Verlag Munich 1995, pages 17-27 and Kunststoff-Handbuch [Plastics Handbook] 3/4, Polyamide [Polyamides], Carl Hanser Verlag, Munich 1998, pages 22-57.

Polyamides for use with preference in accordance with the invention for the polyamide component of the composite are semicrystalline aliphatic polyamides which can be prepared proceeding from diamines and dicarboxylic acids and/or lecterns having at least 5 ring members or corresponding amino acids. The nomenclature of the polyamides in the context of the present invention corresponds to the international standard, the first number(s) indicating the number of carbon atoms in the starting diamine and the last number(s) the number of carbon atoms in the dicarboxylic acid. If only one number is mentioned, this means that the starting material was an α,ω-aminocarboxylic acid or the lectern derived therefrom; for further information, reference is made to H. Dominighaus, Die Kunststoffe und ihre Eigenschaften [The Polymers and Their Properties], pages 272 ff., VDI-Verlag, 1976. According to DE 10 2011 054 519 A1, semicrystalline polyamides have an enthalpy of fusion of more than 25 J/g, measured by the DSC method analogously to ISO 11357 in the 2nd heating operation and integration of the melt peak. This distinguishes them from the semicrystalline polyamides having an enthalpy of fusion in the range from 4 to 25 J/g, measured by the DSC method analogously to ISO 11357 in the 2nd heating operation and integration of the melt peak, and from the amorphous polyamides having an enthalpy of fusion of less than 4 J/g, measured by the DSC method analogously to ISO 11357 in the 2nd healing operation and integration, of the melt peak.

Useful reactants for preparation of the polyamide-based part of the composite are preferably aliphatic and/or aromatic dicarboxylic adds, more preferably adipic add, 2,2,4-trimethyladipic acid, 2,4,4-trimethyladipic acid, azelaic acid, sebacic acid, isophthalic acid, terephthalic acid, aliphatic and/or aromatic diamines, more preferably tetramethylenediamine, pentamethylenediamine, hexamethylenediamine, nonane-1,9-diamine, 2,2,4- and 2,4,4-trimethylhexamethylenediamine, the isomeric diaminodicyclohexylmethanes, diaminodicyclohexylpropanes, bis(aminomethyl)cyclohexane, phenylenediamines, xylylenediamines, aminocarboxylic adds, especially aminocaproic acid, or the corresponding lecterns. Copolyamides of a plurality of the monomers mentioned are included.

Particular preference is given to nylon-6 (PA 6), nylon-6,6 (PA-66) or caprolactam as comonomer-containing copolyamides, very particular preference to random semicrystalline aliphatic copolyamides, especially PA 6/66.

ε-Caprolactam (CAS No. 105-60-2) is preferably used for preparation of polyamide inter alfa. Cyclohexanone oxime is first prepared from cyclohaxanone by reaction with the hydrogensulphate or the hydrochloride of hydroxylamine. This is converted to ε-caprolactam by a Beckmann rearrangement.

Hexamethylenediamine adipate (CAS No. 3323-53-3) is the reaction product of adipic acid and hexamethylenediamine. One of its uses is as an intermediate in the preparation of nylon-6,6. The trivial name AH salt derives from the initial letters of the starting substances. semicrystalline PA6 and/or PA66 for use in accordance with the invention is obtainable, for example, under the Durethan® name from Lanxess Deutschland GmbH, Cologne, Germany.

It will be appreciated that it is also possible to use mixtures of these polyamides, in which case the mixing ratio is as desired. It is also possible for proportions of recycled polyamide moulding compositions and/or fibre recyclates to be present in the polyamide component.

It is likewise also possible to use mixtures of different polyamides, assuming sufficient compatibility. Compatible polyamide combinations are known to those skilled in the art. Polyamide combinations for use with preference are PA6/PA66, PA12/PA1012, PA12/1212, PA612/PA12, PA613/PA12, PA1014/PA12 or PA610/PA12 and corresponding combinations with PA11, more preferably PA6/PA66. In the case of doubt, compatible combinations can be ascertained by routine tests.

Instead of aliphatic polyamides, it is advantageously also possible to use a semiaromatic polyamide wherein the dicarboxylic acid component originates to an extent of 5 to 100 mol % from aromatic dicarboxylic acid having 8 to 22 carbon atoms and which preferably has a crystallite melting point $T_m$ to ISO 11357-3 of at least 25° C., more preferably of at least 260° C. and especially preferably of at least 270° C., Polyamides of this kind are typically referred to by the additional label T (T=semiaromatic). They are preparable from a combination of diamine and dicarboxylic acid, optionally with addition of an ω-aminocarboxylic acid or the corresponding lectern. Suitable types are preferably PA66/6T, PA6/6T, PA6T/MPMDT (MPMD stands for 2-methylpentamethylenediamine), PA9T, PA10T, PA11T, PA12T, PA14T and copolycondensates of these latter types with an aliphatic diamine and an aliphatic dicarboxylic acid or with an ω-aminocarboxylic acid or a lactam. The semiaromatic polyamide can also be used in the form of a blend with another polyamide, preferably with an aliphatic polyamide, more preferably with PA6, PA66, PA11 or PA12.

Another suitable polyamide class is that of transparent polyamides. In most cases, these are amorphous, but may also be microcrystalline. They can be used either on their own or in a mixture with aliphatic and/or semiaromatic polyamides, preferably in a mixture with PA6, PA66, PA11 or PA12. For the achievement of good adhesion, the degree of transparency is immaterial; what is crucial here is that the glass transition point $T_g$, measured in analogy to ISO 11357-3, is at least 110° C., preferably at feast 120° C., more preferably at least 130° C. and more preferably at least 140° C. Preferred transparent polyamides are:

the polyamide formed from 1,12-dodecanedioic acid and 4,4'-diaminodicyclohexylmethane (PAPACM12), especially proceeding from a 4,4'-diaminodicyclohexylmethane having a trans,trans isomer content of 35% to 65%;

the polyamide formed from terephthalic acid and/or isophthalic acid and the isomer mixture of 2,2,4- and 2,4,4-trimethylhexamethylenediamine, the polyamide formed from isophthalic acid and 1,6 hexamethylenediamine, the copolyamide formed from a mixture of terephthalic acid/isophthalic acid and 1,6-hexamethylenediamine, optionally in a mixture with 4,4'-diaminodicyclohexylmethane, the copolyamide of terephthalic acid and/or isophthalic acid, 3,3'-dimethyl-4,4'-diaminodicyclohexylmethane and laurolactam or caprolactam, the (co)polyamide formed from 1,12-dodecanedioic acid or sebacic acid, 3,3'-dimethyl-4,4'-diaminodicyclohexylmethane and optionally laurolactam or caprolactam, the copolyamide formed from isophthalic add, 4,4'-diaminodicyclohexylmethane and laurolactam or caprolactam, the polyamide formed from 1,12-dodecanedioic acid and 4,4'-diaminodicyclohexylmethane (with low trans,trans isomer content), the copolyamide formed from terephthalic acid and/or isophthalic acid and an alkyl-substituted bis(4-aminocyclohexyl)methane homologue, optionally in a mixture with hexamethylenediamine, the copolyamide formed from bis(4-amino-3-methyl-5-ethyl-cyclohexyl)methane, optionally together with a further diamine, and isophthalic add, optionally together with a further dicarboxylic acid, the copolyamide formed from a mixture of m-xylylenediamine and a further diamine, e.g. hexamethylenediamine, and isophthalic acid, optionally together with a further dicarboxylic acid, for example terephthalic acid and/or 2,6-naphthalenedicarboxylic acid, the copolyamide formed from a mixture of bis(4-aminocyclohexyl)methane and bis(4-amino-3-methylcyclohexyl)methane, and aliphatic dicarboxylic acids having 8 to 14 carbon atoms, and also polyamides or copolyamides formed from a mixture containing 1,14-tetradecanedioic acid and an aromatic arylaliphatic or cycloaliphatic diamine.

These transparent polyamides can be varied very substantially by addition of further components, preferably caprolactam, laurolactam or diamine/dicarboxylic acid combinations, or by partial or full replacement of starting components with other components.

Lactams or ω-aminocarboxylic adds which are used as polyamide-forming monomers contain 4 to 19, preferably 6 to 12 carbon atoms. Particular preference is given to using ε-caprolactam, ε-aminocaproic acid, caprylolactam, ω-aminocaprylic acid, laurolactam, aminododecanoic acid and/or ω-aminoundecanoic acid.

Preferred combinations of diamine and dicarboxylic acid are hexamethylenediamine/adipic acid, hexamethylenediamine/dodecanedioic acid, octamethylenediamine/sebacic add, decamethylenediamine/sebacic acid, decamethylenediamine/dodecanedioic acid, dodecamethylenediamine/dodecanedioic acid and dodecamethylenediamine/naphthalene 2,6-dicarboxylic acid. In addition, it is also possible to use all other combinations, especially decamethylenediamine/dodecanedioic acid/terephthalic acid, hexamethylenediamine/adipic acid/terephthalic acid, hexamethylenediamine/adipic acid/caprolactam, decamethylenediamine/dodecanedioic acid/ω-aminoundecanoic acid, decamethylenediamine/dodecanedioic acid/laurolactam, decamethylenediamine/terephthalic acid/laurolactam or dodecamethylenediamine/naphthalene-2,6-dicarboxylic acid/laurolactam.

Polyamide moulding compositions in the context of this invention are formulations of polyamides for the production of the polyamide component in the inventive composite, which are made in order to improve the processing properties or to modify the use properties. In a preferred embodiment, these polyamide moulding compositions, in addition to the polyamide and the liquid polybutadiene copolymer, comprise at least one of the following additives:

a) other polymers in the function as impact modifiers, ABS (ABS=acrylonitrile-butadiene-styrene) or polyphenylene ethers. It should be ensured here that no phase inversion takes place, meaning that the matrix of the moulding composition is formed from polyamide, or that at least an interpenetrating network is present. The person skilled in the art is aware that phase morphology depends primarily on the proportions by volume of the individual polymers and the melt viscosities. If the other polymer has a much higher melt viscosity than the polyamide, the polyamide forms the matrix even when it is present to an extent of less than 50 percent by volume of the thermoplastic fraction, for example to an extent of about 40 percent by volume. This is relevant especially in the case of blends with polyphenylene ether;
b) fibrous reinforcers, especially glass fibres having a round or flat cross section, carbon fibres, aramid fibres, fibres of stainless steel or potassium titanate whiskers;
c) fillers, especially talc, mica, silicate, quartz, zirconium dioxide, aluminium oxide, iron oxides, zinc sulphide, graphite, molybdenum disulphide, titanium dioxide, wollastonite, kaolin, amorphous silicas, magnesium carbonate, chalk, lime, feldspar, barium sulphate, conductive black, graphite fibrils, solid glass beads, hollow glass beads or ground glass;
d) plasticizers, especially esters of p-hydroxybenzoic acid having 2 to 20 carbon atoms in the alcohol component or amides of arylsulphonic adds having 2 to 12 carbon atoms in the amine component, preferably amides of benzenesulphonic add;
e) pigments and/or dyes, especially carbon black, iron oxide, zinc sulphide, titanium dioxide, ultramarine, nigrosin, pearlescent pigments or metal flakes;
f) flame retardants, especially antimony trioxide, hexabromocyclododecane, tetrabromobisphenol, borates, red phosphorus, magnesium hydroxide, aluminium hydroxide, melamine cyanurate and condensation products thereof such as melam, melem, melon, melamine compounds, especially melamine pyrophosphate or melamine polyphosphate, ammonium polyphosphate and organophosphorus compounds or salts thereof, especially resorcinol diphenylphosphate, phosphoric esters or metal phosphinates;
g) processing aids, especially paraffins, fatty alcohols, fatty acid amides, fatty add esters, hydrolysed fatty adds, paraffin waxes, montanates, montan waxes or polysiloxanes; and
h) stabilizers, especially copper salts, molybdenum salts, copper complexes, phosphites, sterically hindered phenols, secondary amines, UV absorbers or HALS stabilizers.

The liquid polybutadiene copolymer for use in accordance with the invention in the polyamide component is incorporated in various ways into the polyamide or into the polyamide component of the polyamide part for the composite. In a preferred embodiment, the liquid polybutadiene copolymer is added to the polyamide during the compounding of the polyamide moulding compositions together with the other added substances, or added as a masterbatch to the polyamide during the compounding, or supplied as a mixture with the polyamide moulding composition, which is usually used in pellet form, via a metering funnel to the injection moulding unit for the injection moulding.

In an alternative preferred embodiment, the polybutadiene copolymer-containing polyamide moulding composition is produced in the form of a granule mixture (dry mixture, dry blend; see Die Kunststoffe—Chemie, Physik, Technologie, edited by B. Carlowitz, Cad Hanser Verlag Munich Vienna, 1990, p. 266) from a polybutadiene copolymer-containing polyamide moulding composition and a further non-polybutadiene copolymer-containing polyamide moulding composition, and hence a polyamide moulding composition having an adjusted polybutadiene copolymer concentration is obtained.

In a further alternative preferred embodiment, a solution of polybutadiene copolymer which is liquid at RT in a suitable solvent mixed with a solution of the polyamide in a suitable solvent. If, proceeding from this solution, the solvents are distilled off, the polybutadiene copolymer-containing polyamide moulding composition is obtained after drying.

Particular preference is given in accordance with the invention to the addition of polybutadiene copolymer which is liquid at RT to the polyamide via a metering funnel in the injection moulding unit during the compounding together with the other added substances, especially preferably during the compounding together with the other added substances.

Methods

Inventive composite parts are produced in one or two stages by at least one shaping method, preferably from the group of extrusion, flat film extrusion, film blowing, extrusion blow moulding, coextrusion, calendaring, casting, compression methods, injection compression methods, transfer compression methods, transfer injection compression methods or injection moulding or the special methods thereof, especially gas injection technology, more preferably by multicomponent injection moulding, very particularly preferably by 2-component injection moulding, also referred to as 2K injection moulding.

The shaping method of extrusion is understood in accordance with the invention to mean the continuous production of semifinished polymer products, especially films, sheets, tubes or profiles. In the extrusion method, what is called the extruder, consisting of a screw and barrel, forces the polymer composition to be processed, in the present invention the polyamide composition, continuously through a mould under pressure. In practice, single-screw and twin-screw extruders or special designs are used. The choice of mould establishes the desired cross-sectional geometry of the extrudate (Ullmann's Encyclopedia of Industrial Chemistry, 7th edition, vol. 28, Plastics Processing, Wiley-VCH Verlag, Weinheim, 2011, p, 169 to 177).

In the extrusion of rubber mixtures, the pass through the mould is followed by the vulcanization. A distinction is made here between vulcanization processes under pressure and ambient pressure vulcanization processes (F. Röthemeyer, F. Sommer "Kautschuktechnologie", 2nd revised edition, Carl Hanser Verlag Munich Vienna, 2006, pages 597 to 727). In the shaping method of coextrusion, polyamide moulding compositions and rubber compositions are combined upstream of the shaping orifice, in order to obtain a composite of polyamide and elastomer after the vulcanization of the extrudate (Ullmann's Encyclopedia of Industrial Chemistry, 7th edition, vol. 28, Plastics Processing, Wiley-VCH Verlag, Weinheim, 2011, p. 177). The coextrusion of polyamide moulding composition and rubber composition can also be effected sequentially, i.e. with one downstream of the other (F. Röthemeyer, F. Sommer "Kautschuktechnologie", 2nd revised edition, Carl Hanser Verlag Munich Vienna, 2006, pages 852 to 853). In the contacting and vulcanization to completion after the two-stage extrusion process, a profile of a polyamide moulding composition produced in a first stage, for example a tube, is ensheathed with a rubber composition and vulcanized to completion, optionally under pressure. The procedure is analogous with sheets formed from polyamide moulding compositions (F. Röthemeyer, F. Sommer "Kautschuktechnologie", 2nd revised edition, Carl Hanser Verlag Munich Vienna, 2006, pages 977 to 978).

With the shaping methods of flat film extrusion, film blowing, extrusion blow moulding, coextrusion, calendaring or casting, it is possible to obtain films or laminates (Die Kunststoffe Chemie, Physik, Technologie, edited by B. Carlowitz, Carl Hanser Verlag Munich Vienna, 1990, p. 422 to 480). Polyamides and rubber mixtures that are to be crosslinked with sulphur can be combined by these methods to give multilayer laminates and multilayer films. Optionally, the production of the film is followed by vulcanization of the rubber component to completion. Coextruded multilayer films are of great significance for packaging technology.

In the compression moulding process, blanks are first produced from the unvulcanized rubber mixture via extrusion with subsequent punching or cutting. The blanks are placed into the cavities of a mould preheated to vulcanization temperature. With application of pressure and heat, shaping is effected to the desired moulding geometry and vulcanization sets in (F. Röthemeyer, F. Sommer "Kautschuktechnologie", 2nd revised edition, Carl Hanser Verlag Munich Vienna, 2006, pages 729 to 738). The procedure is analogous with the compression moulding of thermoplastics. Here, the mould is cooled until demoulding (Ullmann's Encyclopedia of Industrial Chemistry, 7th edition, vol. 28, Plastics Processing, Wiley-VCH Verlag, Weinheim, 2011, p. 167).

Injection compression moulding is a special method of injection moulding for production of high-accuracy polymer parts without warpage. This involves injecting the polymer melt into the mould only with reduced closure force, which leads to slight opening of the halves of the mould. For the filling of the entire mould cavity, the full closure force is applied and hence the moulding is finally demoulded (Ullmann's Encyclopedia of Industrial Chemistry, 7th edition, vol. 28, Plastics Processing, Wiley-VCH Verlag, Weinheim, 2011, p. 187). In the injection compression moulding of rubbers, the procedure is analogous, by injecting the rubber mixture into a mould heated to vulcanization temperature. With the closure of the mould, shaping and vulcanization are effected (F. Röthemeyer, F. Sommer "Kautschuktechnologie", 2nd revised edition, Carl Hanser Verlag Munich Vienna, 2006, pages 738 to 739).

With regard to the transfer compression method and transfer injection compression method, see F. Röthemeyer, F. Sommer "Kautschuktechnologie", 2nd revised edition, Carl Hanser Verlag Munich Vienna, 2006, chapters 12.3 and 12,4, pages 740 to 753, and chapter 12.5, pages 753 to 755.

Injection moulding is a shaping method which is used principally in polymer processing.

This method can be used in an economically viable manner to produce directly usable mouldings in large numbers without further processing. For this purpose, an injection moulding machine is used to plastify the particular polymeric material in an injection moulding unit and inject it into an injection mould. The cavity of the mould determines the shape of the finished part. Nowadays, parts from a few tenths of a gram to the upper kilogram range are producible by injection moulding (Ullmann's Encyclopedia of Industrial Chemistry, 7th edition, vol. 28, Plastics Processing, Wiley-VCH Verlag, Weinheim, 2011, p. 181 to 188).

In the case of multicomponent injection moulding, several components are combined in the injection moulding process to form a composite part. In the case of 2-component injection moulding, two components are combined in the injection moulding process to form a composite part. Preference is given in accordance with the invention to combining a polybutadiene copolymer-containing polyamide component and an elastomer component in the 2-component injection moulding process to form a composite part. The 2-component injection moulding process can be conducted either in a one-stage process or in a two-stage process (F. Johannaber, W. Michaeli, Handbuch Spritzgießen [Injection Moulding Handbook], 2nd edition, Carl Hanser Verlag Munich, 2004, pages 506 to 523; Handbuch Kunststoff-Verbindungstechnik, edited by G. W. Ehrenstein, Carl Hanser Verlag Munich Vienna, 1990, pages 517 to 540).

In the two-stage process, the polybutadiene copolymer-containing polyamide moulding composition for use in accordance with the invention is first used to produce the stiff thermoplastic moulding, especially by one of the abovementioned processing methods, preferably by injection moulding. This thermoplastic moulding can be stored if required.

In a further step, the thermoplastic moulding is contacted with the elastomer component by means of one of the abovementioned processing methods, preferably by injection moulding, and exposed to the vulcanization conditions for the rubber.

Manufacturing can also be effected with a machine (one-stage process) which preferably has a swivel plate or turntable, and/or corresponding mould technology, preferably by means of slide vanes, which open up regions of the cavity for the second component with a time delay. When a machine having a swivel plate, a turntable or a mould having one or more slide vanes is used, a preform is typically produced in a first cycle from the polyamide component in a cavity of the mould, the first station. After a rotational movement of the mould, or by means of transfer technology, the preform is introduced into a second, geometrically altered final injection moulding station (for example by means of the turning technique by a rotation by 180° or 120° in three-cavity moulds, or by means of a slide vane shut-off technique, called the core back method) and, in a second cycle, the rubber mixture for the elastomer part, obtainable from rubber which is to be vulcanized or crosslinked with elemental sulphur, is injected. After demoulding stability of the elastomer component has been attained, the composite can be demoulded.

The melt temperatures of the polyamide for use as thermoplastic component in accordance with the invention are preferably in the range from 180 to 340° C., more preferably in the range from 200 to 300° C. The mould temperatures of the thermoplastic temperature control regions are preferably in the range from 20 to 200° C., more preferably in the range from 60 to 180° C. Preferred melt temperatures of the rubber mixture for the elastomer part, obtainable from rubber which is to be vulcanized or crosslinked with elemental sulphur, in the plastifying barrel are in the range from 20 to 150° C., preferably in the range from 80 to 100° C. Preferred vulcanization temperatures of the elastomer component are in the range from 120 to 220° C., preferably in the range from 140 to 200° C. In a preferred embodiment, the demoulding of the elastomer component from the mould cavity is followed by a heat treatment. In the physical sense, heat treatment means that a solid is heated to a temperature below the melting temperature. This is done over a prolonged period of a few minutes up to a few days. The increased mobility of the atoms can thus balance out structural defects and improve the short- and long-range crystal structure. In this way, the process of melting and (extremely) slow cooling to establish the crystal structure can be avoided. A heat treatment in the context of the present invention is preferably effected at a temperature in the range from 120 to 220° C., preferably at a temperature in the range from 140 to 200° C.

These values are dependent to a considerable degree on the component geometry, especially the thickness and the length of the flow path, the type and position of the gate design, especially hot or cold runner, and on the specific material characteristics. The hold pressure phase is preferably within ranges from 0 to 3000 bar with hold pressure times of 0 seconds until the opening of the mould.

In an alternative preferred embodiment of the present invention, the composite is manufactured from a polyamide part and an elastomer part in what is called inverse 2-component injection injection moulding (2K injection moulding), i.e. in the sequence of first the soft component, then the hard component, the polyamide part in turn being manufactured from the polybutadiene copolymer-containing polyamide moulding composition for use in accordance with the invention and the elastomer part from the rubber to be crosslinked in the presence of free sulphur.

In inverse 2K injection moulding, the rubber mixture for the elastomer part, obtainable from rubber which is to be vulcanized or crosslinked with elemental sulphur, is thus first injection-moulded and vulcanized, then the polybutadiene copolymer-containing polyamide moulding composition for use in accordance with the invention is applied by injection moulding. Exactly as in the (conventional) 2K injection moulding process, manufacturing can be effected in a machine (one-stage process) which preferably has a swivel plate or turntable, and/or corresponding mould technology, preferably by means of slide vanes, which open up regions of the cavity for the second component with a time delay. The corresponding injection moulding parameters can be adopted from the (conventional) 2K injection moulding process (barrel temperatures, mould temperatures, vulcanization times, hold pressure, hold pressure times, etc.). If the elastomer component is not vulcanized to completion, but only partly vulcanized until dimensionally stable, and then the polyamide moulding composition is applied by injection moulding, an advantage of the inverse 2K injection moulding process is experienced. This is because it is possible in this way to shorten the cycle time for the production of the overall composite. Since the cycle time for the production of the polyamide component is typically very much shorter than that of the elastomer component, it is surprisingly possible by this preferred process to reduce the cycle time for the production of the entire composite to the cycle time for the production of the elastomer component. In a preferred embodiment, in inverse 2K injection moulding too, the demoulding of the composite from the mould cavity is followed by a heat treatment.

The process of injection moulding of polyamide features melting (plastification) of the raw material, i.e. the inventive moulding composition to be used, preferably in pellet form, in a heated cylindrical cavity, and injection thereof as an injection moulding material under pressure into a temperature-controlled cavity. After the cooling (solidification) of the material, the injection moulding is demoulded.

The injection moulding process is broken down into the component steps of:
1. Plastification/melting
2. injection phase (filling operation)
3. Hold pressure phase (owing to thermal contraction in the course of crystallization)
4. Demoulding.

An injection moulding machine to be used for this purpose consists of a closure unit, the injection unit, the drive and the control system. The closure unit includes fixed and movable platens for the mould, an end platen, and tie bars and drive for the movable mould platen (toggle joint or hydraulic closure unit).

An injection unit comprises the electrically heatable barrel, the drive for the screw (motor, gearbox) and, if necessary, the hydraulics for moving the screw and the injection unit. The task of the injection unit is to melt the powder or the pellets, to meter them, to inject them and to maintain the hold pressure (owing to contraction). The problem of the melt flowing backward within the screw (leakage flow) is solved by non-return valves.

In the injection mould, the incoming polyamide melt is then cooled, and hence the component, i.e. the product or moulding, which is to be produced is produced. Two halves of the mould are always needed for this purpose. In injection moulding, the following functional systems are distinguished:
runner system
shaping inserts
venting
machine casing and force absorber
demoulding system and movement transmission
temperature control.

For the injection moulding of polyamides, see also Kunststoff-Handbuch 3/4, Polyamide, Carl Hanser Verlag, Munich 1998, pages 315-352.

The process of injection mouldings for production of vulcanized rubber mouldings features plastification of the raw material, i.e. the rubber mixture to be crosslinked, in a heated cylindrical cavity, and injection thereof as an injection moulding material under pressure into a cavity heated to vulcanization temperature. After the material has been vulcanized to completion, the injection moulding is demoulded. The cylinder and screws of the injection moulding machine are designed in a manner known to those skilled in the art for rubber processing and the mould is heatable to vulcanization temperature. The vulcanization times for the rubber component are guided not only by the rubber mixture but also by the vulcanization temperatures and by the geometry of the rubber component to be manufactured. They are preferably between 15 s and 15 min; lower temperatures and thicker rubber parts entail longer vulcanization times (F. Röthemeyer, F. Sommer "Kautschuktechnologie", 2nd revised edition, Carl Hanser Verlag Munich Vienna, 2006, pages 755 to 815).

In the case of the optional additional use of external demoulding aids, care should be taken that they do not get into the interface layer of the tools, since they can impair bond strength.

Useful demoulding agents, also referred to as lubricants or mould release agents, for use in one embodiment preferably include saturated and partly unsaturated fatty acids and oleic acids and derivatives thereof, especially fatty acid esters, fatty acid salts, fatty alcohols, fatty acid amides, which are preferably used as a mixture constituent, and also additionally products applicable to the mould surface, especially products based on low molecular weight silicone compounds, products based on fluoropolymers and products based on phenol resins.

The demoulding agents are used as a mixture constituent preferably in amounts of about 0.1 to 10 phr, more preferably in amounts of 0.5 to 5 phr, based on 100 phr of the elastomer(s) in the rubber component.

In a preferred execution, the present invention relates to a composite part composed of at least one part produced from at least one polyamide moulding composition and at least one elastomer part, characterized in that the polyamide moulding composition contains at least 30% by weight of a mixture of
a) 60 to 99.9 parts by weight of polyamide and
b) 0.1 to 40 parts by weight of at least one polybutadiene copolymer which is liquid at RT, where the sum total of the parts by weight of a) and b) is 100 and the polybutadiene copolymer has a dynamic viscosity measured by the cone-plate method analogously to DIN 53019 at a shear rate of 50 1/s, at standard pressure and at a temperature of 25° C. in the range from 100 to 1 000 000 mPas, and the polyamide used is PA6 or PA66, and at least one rubber from the group of NR, EPDM, NBA, CR, BR, SBR, XNBR which is to be crosslinked with elemental sulphur as crosslinking agent is used for the elastomer part.

In a preferred execution, the present invention relates to a composite part composed of at least one part produced from at least one polyamide moulding composition and at least one elastomer part, characterized in that the polyamide moulding composition contains at least 30% by weight of a mixture of
  a) 60 to 99.9 parts by weight of polyamide and
  b) 0.1 to 40 parts by weight of at least one polybutadiene copolymer which is liquid at RT,
where the sum total of the parts by weight of a) and b) is 100 and the polybutadiene copolymer has a dynamic viscosity, measured by the cone-plate method analogously to DIN 53019 at a shear rate of 50 1/s, under atmospheric pressure and at a temperature of 25° C., in the range from 100 to 1 000 000 mPas, and the polyamide used is PA6, and at least one rubber from the group of NA, EPDM, NBA, CR, BR, SBR, XNBR which is to be crosslinked with elemental sulphur as crosslinking agent is used for the elastomer part.

In a preferred execution, the present invention relates to a composite part composed of at least one part produced from at least one polyamide moulding composition and at least one elastomer part, characterized in that the polyamide moulding composition contains at least 30% by weight of a mixture of
  a) 60 to 99.9 parts by weight of polyamide and
  b) 0.1 to 40 parts by weight of at least one polybutadiene copolymer which is liquid at RT,
where the sum total of the parts by weight of a) and b) is 100 and the polybutadiene copolymer has a dynamic viscosity measured by the cone-plate method to DIN 53019 at a shear rate of 50 1/s, at standard pressure and at a temperature of 25° C. in the range from 100 to 1 000 000 mPas, and the polyamide used is PA66, and at least one rubber from the group of NR, EPDM, NBR, CR, BR, SBR, XNBR which is to be crosslinked with elemental sulphur as crosslinking agent is used for the elastomer part.

In a preferred execution, the present invention relates to a composite part composed of at least one part produced from at least one polyamide moulding composition and at least one elastomer part, characterized in that the polyamide moulding composition contains at least 30% by weight of a mixture of
  a) 60 to 99.9 parts by weight of polyamide and
  b) 0.1 to 40 parts by weight of a SBR or NBR which is liquid at RT,
where the sum total of the parts by weight of a) and b) is 100, the polyamide used is PA6 or PA66, and at least one rubber from the group of NR, EPDM, NBR, CR, BR, SBR, XNBR which is to be crosslinked with elemental sulphur as crosslinking agent is used for the elastomer part.

In a preferred execution, the present invention relates to a composite part composed of at least one part produced from at least one polyamide moulding composition and at least one elastomer part, characterized in that the polyamide moulding composition contains at least 30% by weight of a mixture of
  a) 60 to 99.9 parts by weight of polyamide and
  b) 0.1 to 40 parts by weight of at least one SBR or NBR which is liquid at RT,
where the sum total of the parts by weight of a) and b) is 100, the polyamide used is PA6, and at least one rubber from the group of NA, EPDM, NBR, CR, BR, SBR, XNBR which is to be crosslinked with elemental sulphur as crosslinking agent is used for the elastomer part.

In a preferred execution, the present invention relates to a composite part composed of at least one part produced from at least one polyamide moulding composition and at least one elastomer part, characterized in that the polyamide moulding composition contains at least 30% by weight of a mixture of
  a) 60 to 99.9 parts by weight of polyamide and
  b) 0.1 to 40 parts by weight of at least one SBR or NBR which is liquid at RT,
where the sum total of the parts by weight of a) and b) is 100, the polyamide used is PA66, and at least one rubber from the group of NR, EPDM, NBR, CR, BR, SBR, XNBR which is to be crosslinked with elemental sulphur as crosslinking agent is used for the elastomer part.

In a preferred execution, the present invention relates to a composite part composed of at least one part produced from at least one polyamide moulding composition and at least one elastomer part, characterized in that the polyamide moulding composition contains at least 30% by weight of a mixture of
  a) 60 to 99.9 parts by weight of polyamide and
  b) 0.1 to 40 parts by weight of at least one SBR which is liquid at RT,
where the sum total of the parts by weight of a) and b) is 100, the polyamide used is PA6, and at least one rubber from the group of NR, EPDM, NBA, CR, BR, SBR, XNBR which is to be crosslinked with elemental sulphur as crosslinking agent is used for the elastomer part.

In a preferred execution, the present invention relates to a composite part composed of at least one part produced from at least one polyamide moulding composition and at least one elastomer part, characterized in that the polyamide moulding composition contains at least 30% by weight of a mixture of
  a) 60 to 99.9 parts by weight of polyamide and
  b) 0.1 to 40 parts by weight of at least one SBR which is liquid at RT,
where the sum total of the parts by weight of a) and b) is 100, the polyamide used is PA66, and at least one rubber from the group of NR EPDM, NBA, CR, SR, SEM, XNBR which is to be crosslinked with elemental sulphur as crosslinking agent is used for the elastomer part.

In a preferred execution, the present invention relates to a composite part composed of at least one part produced from at least one polyamide moulding composition and at least one elastomer part, characterized in that the polyamide moulding composition contains at least 30% by weight of a mixture of
  a) 60 to 99.9 parts by weight of polyamide and
  b) 0.1 to 40 parts by weight of at least one SBR which is liquid at RT,
where the sum total of the parts by weight of a) and b) is 100, the polyamide used is PA6, and NA rubber which is to be crosslinked with elemental sulphur as crosslinking agent is used for the elastomer part.

In a preferred execution, the present invention relates to a composite part composed of at least one part produced from at least one polyamide moulding composition and at least one elastomer part, characterized in that the polyamide moulding composition contains at least 30% by weight of a mixture of
- a) 60 to 99.9 parts by weight of polyamide and
- b) 0.1 to 40 parts by weight of at least one SBR which is liquid at RT, where the sum total of the parts by weight of a) and b) is 100, the polyamide used is PA66, and NR rubber which is to be crosslinked with elemental sulphur as crosslinking agent is used for the elastomer part.

In a preferred execution, the present invention relates to a composite part composed of at least one part produced from at least one polyamide moulding composition and at least one elastomer part, characterized in that the polyamide moulding composition contains at least 30% by weight of a mixture of
- a) 60 to 99.9 parts by weight of polyamide and
- b) 0.1 to 40 parts by weight of at least one SBR which is liquid at RT, where the sum total of the parts by weight of a) and b) is 100, the polyamide used is PA6, and EPDM rubber which is to be crosslinked with elemental sulphur as crosslinking agent is used for the elastomer part.

In a preferred execution, the present invention relates to a composite part composed of at least one part produced from at least one polyamide moulding composition and at least one elastomer part, characterized in that the polyamide moulding composition contains at least 30% by weight of a mixture of
- a) 60 to 99.9 parts by weight of polyamide and
- b) 0.1 to 40 parts by weight of at least one SBR which is liquid at RT, where the sum total of the parts by weight of a) and b) is 100, the polyamide used is PA66, and EPDM rubber which is to be crosslinked with elemental sulphur as crosslinking agent is used for the elastomer part.

In a preferred execution, the present invention relates to a composite part composed of at least one part produced from at least one polyimide moulding composition and at least one elastomer part, characterized in that the polyamide moulding composition contains at least 30% by weight of a mixture of
- a) 60 to 99.9 parts by weight of polyamide and
- b) 0.1 to 40 parts by weight of at least one SBR which is liquid at RT, where the sum total of the parts by weight of a) and b) is 100, the polyamide used is PA6, and NBR rubber which is to be crosslinked with elemental sulphur as crosslinking agent is used for the elastomer part.

In a preferred execution, the present invention relates to a composite part composed of at least one part produced from at least one polyimide moulding composition and at least one elastomer part, characterized in that the polyamide moulding composition contains at least 30% by weight of a mixture of
- a) 60 to 99.9 parts by weight of polyamide and
- b) 0.1 to 40 parts by weight of at least one SBR which is liquid at RT, where the sum total of the parts by weight of a) and b) is 100, the polyamide used is PA66, and NBR rubber which is to be crosslinked with elemental sulphur as crosslinking agent is used for the elastomer part.

In a preferred execution, the present invention relates to a composite part composed of at least one part produced from at least one polyamide moulding composition and at least one elastomer part, characterized in that the polyamide moulding composition contains at least 30% by weight of a mixture of
- a) 60 to 99.9 parts by weight of polyamide and
- b) 0.1 to 40 parts by weight of at least one SBR which is liquid at RT, where the sum total of the parts by weight of a) and b) is 100, the polyamide used is PA6, and CR rubber which is to be crosslinked with elemental sulphur as crosslinking agent is used for the elastomer part.

In a preferred execution, the present invention relates to a composite part composed of at least one part produced from at least one polyamide moulding composition and at least one elastomer part, characterized in that the polyamide moulding composition contains at least 30% by weight of a mixture of
- a) 60 to 99.9 parts by weight of polyamide and
- b) 0.1 to 40 parts by weight of at least one SBR which is liquid at RT, where the sum total of the parts by weight of a) and b) is 100, the polyamide used is PA6, and CR rubber which is to be crosslinked with elemental sulphur as crosslinking agent is used for the elastomer part.

In a preferred execution, the present invention relates to a composite part composed of at least one part produced from at least one polyamide moulding composition and at least one elastomer part, characterized in that the polyamide moulding composition contains at least 30% by weight of a mixture of
- a) 60 to 99.9 parts by weight of polyamide and
- b) 0.1 to 40 parts by weight of at least one SBR which is liquid at RT, where the sum total of the parts by weight of a) and b) is 100, the polyamide used is PA6, and CR rubber which is to be crosslinked with elemental sulphur as crosslinking agent is used for the elastomer part.

In a preferred execution, the present invention relates to a composite part composed of at least one part produced from at least one polyamide moulding composition and at least one elastomer part, characterized in that the polyamide moulding composition contains at least 30% by weight of a mixture of
- a) 60 to 99.9 parts by weight of polyamide and
- b) 0.1 to 40 parts by weight of at least one SBR which is liquid at RT, where the sum total of the parts by weight of a) and b) is 100, the polyamide used is PA66, and BR rubber which is to be crosslinked with elemental sulphur as crosslinking agent is used for the elastomer part.

In a preferred execution, the present invention relates to a composite part composed of at least one part produced from at least one polyamide moulding composition and at least one elastomer part, characterized in that the polyamide moulding composition contains at least 30% by weight of a mixture of
- a) 60 to 99.9 parts by weight of polyamide and
- b) 0.1 to 40 parts by weight of at least one SBR which is liquid at RT, where the sum total of the parts by weight of a) and b) is 100, the polyamide used is PA6, and SBR rubber which is to be crosslinked with elemental sulphur as crosslinking agent is used for the elastomer part.

In a preferred execution, the present invention relates to a composite part composed of at least one part produced from at least one polyamide moulding composition and at least one elastomer part, characterized in that the polyamide moulding composition contains at least 30% by weight of a mixture of
- a) 60 to 99.9 parts by weight of polyamide and
- b) 0.1 to 40 parts by weight of at least one SBR which is liquid at RT, where the sum total of the parts by weight of a) and b) is 100, the polyamide used is PA66, and SBR rubber which is to be crosslinked with elemental sulphur as crosslinking agent is used for the elastomer part.

In a preferred execution, the present invention relates to a composite part composed of at least one part produced from at least one polyamide moulding composition and at least one elastomer part, characterized in that the polyamide moulding composition contains at least 30% by weight of a mixture of
- a) 60 to 99.9 parts by weight of polyamide and
- b) 0.1 to 40 parts by weight of at least one SBR which is liquid at RT, where the sum total of the parts by weight of a) and b) is 100, the polyamide used is PA6, and XNBR rubber which is to be crosslinked with elemental sulphur as crosslinking agent is used for the elastomer part.

In a preferred execution, the present invention relates to a composite part composed of at least one part produced from at least one polyamide moulding composition and at least one elastomer part, characterized in that the polyamide moulding composition contains at least 30% by weight of a mixture of
- a) 60 to 99.9 parts by weight of polyamide and
- b) 0.1 to 40 parts by weight of at least one SBR which is liquid at RT, where the sum total of the parts by weight of a) and b) is 100, the polyamide used is PA66, and XNBR rubber which is to be crosslinked with elemental sulphur as crosslinking agent is used for the elastomer part.

In a very particularly preferred embodiment, the present invention relates to a composite part composed of at least one part produced from at least one polyamide moulding composition and at least one part produced from at least one rubber which can be crosslinked with elemental sulphur as vulcanizing agent, characterized in that the polyamide moulding composition contains at least 30% by weight, preferably at least 45% by weight, more preferably at least 55% by weight and especially preferably at least 65% by weight of the mixture of the following components:
- a) 60 to 99.9 parts by weight, preferably 75 to 99.8 parts by weight and more preferably 85 to 99.7 parts by weight and most preferably 88 to 99.5 parts by weight of polyamide and
- b) 0.1 to 40 parts by weight, preferably 0.2 to 25 parts by weight, more preferably 0.3 to 15 parts by weight, most preferably 0.5 to 12 parts by weight, of at least one polybutadiene copolymer which is liquid at RT, preferably at least one SBR which is liquid at RT, where the sum total of the parts by weight of a) and b) is 100.

The present invention additionally relates to the use of at least one polybutadiene copolymer which is liquid at RT, in the polyamide component for increasing the bond strength of a composite part composed of at least one part produced from a polyamide moulding composition and at least one part produced from an elastomer, obtainable from rubber which can be vulcanized or crosslinked with elemental sulphur, which has been obtained by at least one shaping method.

EXAMPLES

1. Polyamide Components Used:

The compositions of the polyamide components are summarized in Table 1. The constituents of the polyamide components are stated in parts by mass based on the overall moulding composition.

TABLE 1

Composition of the polyamide moulding composition for the polyamide-based component of the composite

| Polyamide component | 1 | 2 |
|---|---|---|
| Constituent A | 100 | 90 |
| Constituent B | — | 10 |
| Production of dry blend after compounding | — | Yes |
| Resulting contents after compounding and dry blend production | | |
| Polybutadiene copolymer | 0.0 | 5.0 |
| Glass fibres | 30.0 | 28.5 |

Product names and manufacturers of the constituents of the polyamide components in Table 1:

Constituent A=Durethan® BKV30 H2.0 901510 from LANXESS Deutschland GmbH, Cologne, with the ISO moulding composition name ISO 1874-PAZ, GHR, 14-090, GF 30, a heat-stabilized polyamide 6 admixed with 30% glass fibres Constituent B=polybutadiene copolymer, Ricon® 181 (liquid styrene-1,3-butadiene copolymer) having a dynamic viscosity at 25° C. (DIN 53019, cone/plate method, shear rate 50 1/s) of 14 600 mPas with a number-average molecular weight Mn in the region of 3200 g/mol (manufacturer data) from Cray Valley USA, LLC, Exton, Pa., USA Production of the Polyamide Components in Table 1:

The constituents of the polyamide components 2 according to Table 1 were mixed to give polyamide moulding compositions in a ZSK 26 twin-screw extruder from Coperion GmbH, Stuttgart (formerly Coperion Werner & Pfleiderer GmbH & Co. K G, Stuttgart). The compounding was conducted at a melt temperature of 260 to 300° C. and with a throughput of 8 to 60 kg/h. The melt was discharged as a strand into a water bath and then pelletized.

In the case of polyamide component 2, after compounding and pelletization, a dry blend was produced by dry mixing of the polyamide moulding composition having the composition according to Table 1 that originated from the compounding and pelletization, and a Durethan® BKV30 H2.0 901510 polyamide moulding composition from LANXESS Deutschland GmbH, Cologne, in equal parts by weight (1:1). Since Durethan® BKV30 H2.0 901510 does not contain any polybutadiene copolymer, polyamide component 2 as a dry blend had a content of polybutadiene copolymer Ricon® 181 of 5%.

Table 1 lists the content of polybutadiene copolymer and glass fibres in polyamide components 1 to 2 that result after compounding and dry blend production.

After compounding and dry blend production, the polyamide moulding compositions were dried at 80° C. in a dry air dryer for 4 hours before they were then processed in an injection moulding operation.

2. Elastomer Components Used:

The compositions of the rubber mixtures of the elastomer components that result after vulcanization are summarized in Table 2.

The rubber mixture constituents of the elastomer components are stated in parts by mass based on 100 parts by mass of rubber.

TABLE 2

Composition of the rubber mixtures of the elastomer components that result after vulcanization

| Elastomer component | A |
|---|---|
| Keltan ® 2450 | 100 |
| N550 | 60 |
| PEG-4000 | 5 |
| Sunpar ® 2280 | 5 |
| stearic acid | 3 |
| ZnO | 5 |
| sulphur | 0.7 |
| TBBS | 1 |
| TBzTD-70 | 3.5 |

Product names and manufacturers of the rubber mixture constituents in Table 2:

Keltan® 2450=ethylene-propylene-diene rubber (EPDM) from LANXESS Deutschland GmbH, Cologne N550=Corax® N550 industrial carbon black from Orion Engineered Carbons GmbH PEG-4000=plasticizer from Carl Roth GmbH & Co. K G, Karlsruhe Sunpar® 2280=paraffinic plasticizer oil from Schill & Seilacher "Struktol" GmbH, Hamburg stearic acid=Edenor® ST4A stearic acid from BCD-Chemie GmbH, Hamburg ZnO=Zinkweiss Rotsiegel zinc oxide from Grillo-Werke A G, Goslar sulphur 90/95 ground sulphur as vulcanizing agent from SOLVAY GmbH, Hanover TBSS=Vulkacit NZ vulcanization accelerator from LANXESS Deutschland GmbH, Cologne TBzTD-70=Rhenogran® TBzTD-70 polymer-bound vulcanization accelerator from Rhein Chemie Rheinau GmbH, Mannheim The rubber mixtures were produced by means of a Werner & Pfleiderer GK 5E laboratory internal mixer.

3. Measurement of Tensile Stress at Break and Tensile Strain at Break for the Elastomer Components in a Tensile Test to DIN 53504:

To determine the tensile stress at break and tensile strain at break for the elastomer components, tensile tests to DIN 53504 were conducted under standard climatic conditions to DIN EN ISO 139. The specimens were produced according to DIN ISO 23529. The rubber mixtures produced by means of a Werner & Pfleiderer GK 5E laboratory internal mixer according to the compositions in Table 2 were compressed and vulcanized to give sheets of thickness 2 mm at 165° C. and 200 bar, then S2 test specimens were cut out with a cutting device. After the thickness of the specimens had been measured, they were clamped in between the clamps, a pretensioning force was applied and the samples were then stressed until they fractured with a testing speed of 200 mm/min. The results obtained from this were the tensile stresses at break and tensile strains at break. The results of the tensile testing are compiled in Table 3.

TABLE 3

Results of tensile testing to DIN 53504 of the elastomer components with regard to tensile stress at break and tensile strain at break

| Elastomer component | A |
|---|---|
| $\sigma_R \geq 10$ MPa | + |
| $\varepsilon_R \geq 300\%$ | + |

A "+" sign in Table 3 means that the tensile stress at break $\sigma_R$ of the elastomer component is ≥10 MPa or the tensile strain at break $\varepsilon_R$ of the elastomer component is ≥300%.

A "−" sign in Table 3 means that the tensile stress at break of the elastomer component $\sigma_R$ is <10 MPa or the tensile strain at break of the elastomer component $\varepsilon_R$ is <300%.

As apparent from Table 3, the tensile stress at break $\sigma_R$ of the elastomer component A, measured in a tensile test to DIN 53504, was ≥10 MPa, and the tensile strain at break $\varepsilon_R$ of the elastomer component A, measured in a tensile test to DIN 53504, was ≥300%. The elastomer component used can therefore be described as industrially utilizable for the purposes of the present invention.

4. Production of the Composite Specimens from Polyamide Component and Elastomer Component by means of 2-Component Injection Moulding:

To detect the rise in bond strength through the inventive combination of materials, composite specimens were produced in a multicomponent injection moulding process. An Engel Combimelt 200H/200L/80 2-component injection moulding machine from Engel Austria GmbH, Schwertberg, Austria was used, and the injection mould used was a 2-cavity turntable mould.

For this purpose, the thermoplastic polyamide here was injected into the cavity of the first station of the injection mould and a 60 mm×68 mm×4 mm sheet was produced. After cooling time had elapsed, the mould opened and the thermoplastic moulding based on polyamide was conveyed into the second station by a rotation of the turntable by 180°, in which the rubber was then injected for overmoulding. The rubber cavity had the dimensions 140 mm×25 mm×6 mm and formed an overlap with respect to the thermoplastic sheet of 44.5 mm×25 mm. After the operation for injection of the rubber component and the vulcanization process in the injection mould, the mould was than opened and the composite specimen could be removed.

The composite specimens produced in the course of the operations relating to the present invention corresponded in terms of appearance roughly to the standard composite specimen as shown in FIG. 1 of EP 2 392 610 A1, in which K represents the rubber component and T the thermoplastic—polyamide here. EP 2 392 610 A1 is fully encompassed by the present application.

The production of composite specimens from polyamide component and elastomer component was conducted with various 2K injection moulding settings as a direct 2K injection moulding process, i.e. as a one-stage 2K injection moulding process. The preparation of the polyamide component is followed directly by the injection moulding of the elastomer component.

The 2K injection moulding settings for the production of composite specimens from polyamide component and elastomer component are summarized in Table 4 and Table 5.

TABLE 4

2K injection moulding settings for the production of composite specimens from polyamide component and elastomer component

| 2K injection moulding setting | | Barrel temperature [° C.] | Mould temperature [° C.] | Injection rate [cm³/s] | Hold pressure [bar] | Hold pressure time [s] | Cooling time [s] |
|---|---|---|---|---|---|---|---|
| 1 | Polyamide | 270/275/275/270/265 | 165 | 15 | 450 | 20 | 15 |
|   | Elastomer | 100 | 165 | 7 | 300 | 90 | — |
| 2 | Polyamide | 270/275/275/270/265 | 150 | 5 | 450 | 20 | 15 |
|   | Elastomer | 100 | 150 | 7 | 300 | 90 | — |
| 3 | Polyamide | 270/275/275/270/265 | 170 | 5 | 450 | 20 | 15 |
|   | Elastomer | 100 | 170 | 7 | 300 | 90 | — |

TABLE 5

Vulcanization times, reported in minutes, for the production of the elastomer component of the composite specimens at appropriate mould temperatures

| Mould temperature | 150° C. | 165° C. | 170° C. |
|---|---|---|---|
| Elastomer component A | 18 | 10 | 8 |

Table 6 lists the injection moulding settings used to manufacture the composite specimens produced from polyamide component 1 or 2 and elastomer component A.

5. Testing of the Composite Specimens from Polyamide Component and Elastomer Component by means of a Peel Test:

After storage of the composite specimens based on the compositions of polyamide component 1 to 2 and elastomer component A for at least 24 hours, these were subjected to a 90° peel test to test the bond strength. The peel test was conducted on the basis of DIN ISO 813 using a Zwick Z010 universal tester from Zwick GmbH & Co. K G, Ulm. Germany. In this test, the composite specimen was clamped at an angle of 90° in a tensile tester with a special device to accommodate the thermoplastic component—a polyamide component here—and placed under tensile stress. The pre-tensioning force was 0.3 N, the testing speed 10 mm/min. The maximum bond strength is obtained from the maximum force measured in N based on the width of the elastomer component of 25 mm.

The results of the peel tests on the composite specimens of polyamide component 1 and 2 respectively and elastomer component A and produced at various 2K injection moulding settings 1 to 3 are summarized in Table 6.

TABLE 6

Results of the peel tests on the composite specimens of polyamide component 1 and 2 respectively and elastomer component A

| Polyamide | 2K injection moulding setting | | | | | |
|---|---|---|---|---|---|---|
| component | 1 | | 2 | | 3 | |
| 1 | Comp. 1 | − | Comp. 2 | − | Comp. 3 | − |
| 2 | Ex. 1 | + | Ex. 2 | + | Ex. 3 | + |

A "+" sign in Table 6 indicates a composite specimen of a polyamide component and an elastomer component in which a bond strength of ≥3 N/mm was found in the peel test.
A "−" sign in Table 6 indicates a composite specimen of a polyamide component and an elastomer component in which a bond strength of <3 N/mm was found in the peel test.

Table 6 shows that the inventive use of polybutadiene copolymer which is liquid at RT for additization of the polyamide component in the production of composite specimens in direct adhesion, i.e. without using an adhesion promoter, with an elastomer component obtainable from rubber which is to be vulcanized or crosslinked with elemental sulphur led to a firm bond with a bond strength of at least 3 N/mm. At the same time, the elastomer components in these composites had a tensile stress at break of at least 10 MPa and a tensile strain at break of at least 300%, meaning that they are industrially utilizable. For the production of specimens with a firm bond, the polybutadiene copolymer-containing polyamide moulding compositions PA6 and elastomer components obtainable from rubbers which are to be vulcanized or crosslinked with elemental sulphur, here EPDM, were meth Examples 1 to 3 (Ex. 1 to 3) show that this firm bond can be achieved using different 2K injection moulding settings 1 to 3.

Comparative examples 1 to 3 (Comp. 1 to 3) in Table 6 record that a polyamide moulding composition PA6 not containing polybutadiene copolymer, using different 2K injection moulding settings 1 to 3, does not result in a firm bond to elastomer components obtainable from rubbers which are to be vulcanized or crosslinked with elemental sulphur, here EPDM, with a bond strength of less than 3 N/mm.

The examples 1 to 3 in Table 6 show that styrene-1,3-butadiene copolymer Ricon® 181, without additional adhesion promoter, are usable for a firm bond by direct adhesion of a polyamide component and an elastomer component, the latter being obtainable from rubber which can be vulcanized or crosslinked with elemental sulphur as crosslinking agent.

What is claimed is:

1. A composite part comprising at least one part comprising at least one polyamide moulding composition, directly adhered with at least one part comprising at least one elastomer, wherein:
   the polyamide moulding composition comprises a mixture of polyamide and at least one polybutadiene copolymer which is liquid at room temperature (RT); and
   the elastomer comprises a rubber which is crosslinkable or vulcanizable with elemental sulphur.

2. The composite part as claimed in claim 1, wherein the polyamide moulding composition comprises at least 30% by weight of a mixture of:
   a) 60 to 99.9 parts by weight of polyamide; and
   b) 0.1 to 40 parts by weight of at least one polybutadiene copolymer which is liquid at RT,
   where the sum total of the parts by weight of a) and b) is 100.

3. The composite part as claimed in claim 1, wherein the polybutadiene copolymer has a dynamic viscosity of 100 to 1,000,000 mPas, measured by the cone-plate method to DIN 53019 at a sheer rate of 50 ifs, at standard pressure, and at a temperature of 25° C.

4. The composite part as claimed in claim 3, wherein the polybutadiene copolymer comprises a copolymer of 1,3 butadiene with a further monomer having at least one C=C bond.

5. The composite part as claimed in claim 1, wherein the part comprising at least one polyamide moulding composition does not contain any coagent for peroxidic crosslinking of rubbers.

6. The composite part as claimed in claim 1, wherein the rubber contains C=C double bonds.

7. The composite part as claimed in claim 6, wherein the rubber containing C=C double bonds comprises a rubber based on dienes.

8. The composite part as claimed in claim 7, wherein the rubber is selected from the group consisting of natural rubber (NR), ethylene-propylene-diene rubbers (EPDMs), styrene/diolefin rubbers, polybutadiene rubber (BR), polyisoprene (IR), butyl rubber (IIR), halobutyl rubber (XIIR), nitrile rubber (NBR), hydrogenated nitrile rubber (H-NBR), carboxylated butadiene/acrylonitrile rubber (XNBR), and polychloroprene (CR), and mixtures of two or more of the aforementioned rubbers.

9. The composite part as claimed in claim 8, wherein the rubber is at least one rubber selected from the group consisting of natural rubber (NR), ethylene-propylene-diene rubber (EPDM), styrene/butadiene rubber (SBR), carboxylated butadiene/acrylonitrile rubber (XNBR), polychloroprene (CR), nitrile rubber (NBR), and polybutadiene (BR).

10. The composite part as claimed in claim 1, wherein the polyamide is PA6, PA66, PA610, PA88, PA612, PA810, PA108, PA9, PA613, PA614, PA612, PA1010, PA10, PA814, PA148, PA1012, PA11, PA1014, PA1212, PA12 or mixtures of the listed polyamides, or copolyamides containing caprolactam as comonomer.

11. The composite part as claimed in claim 10, wherein the copolyamides containing caprolactam as comonomer are random semicrystalline aliphatic copolyamides.

12. The composite part as claimed in claim 11, wherein the polyamide mixtures are polyimide combinations from the group consisting of PA6/PA66, PA12/PA1012, PA12/1212, PA612/PA12, PA613/PA12, PA1014/PA12 or PA610/PA12, and corresponding combinations with PA11.

13. A method of boosting composite adhesion between components of a composite part, the components comprising at least one part comprising a polyamide moulding composition, and at least one part comprising are elastomer obtained from rubber crosslinkable or vulcanizable with elemental sulphur, the method comprising mixing at least one polybutadiene copolymer which is liquid at room temperature (RT) with the polyamide moulding composition.

14. The method as claimed in claim 13, wherein the composite part is at least a portion of a product that conducts liquid media and/or gaseous media and the product comprises gaskets, membranes, gas pressure accumulators, hoses, housings for motors, pumps and electrically operated tools, rollers, tyres, couplings, stop buffers, conveyor belts, drive belts, multilayer laminates and multilayer films, and also sound- and vibration-deadening components.

15. A method for producing composite parts which are composed of at least one part comprising at least one polyamide moulding composition, and at least one part comprising at least one elastomer comprising a rubber vulcanizable or crosslinkable with elemental sulphur as crosslinking agent, the method comprising:
  either, contacting the at least one part comprising the at least one polyamide moulding composition with at least one rubber comprising elemental sulphur to form a composite, and subjecting the composite to vulcanization conditions for the rubber,
  or, contacting the at least one part comprising rubber with at least one polyamide moulding composition to form a composite, and subjecting the composite to vulcanization conditions for the rubber,
  wherein the polyamide moulding composition comprises a mixture of polyamide with at least one polybutadiene copolymer which is liquid at room temperature (RT).

16. The composite part as claimed in claim 2, wherein:
  the polybutadiene copolymer has a dynamic viscosity of 100 to 1,000,000 mPas, measured by the cone-plate method to DIN 53019 at a sheer rate of 50 1/s, at standard pressure, and at a temperature of 25° C.;
  the polybutadiene copolymer is a copolymer of 1,3 butadiene with styrene or acrylonitrile;
  the part comprising at least one polyamide moulding composition does not contain any coagent for peroxide crosslinking of rubbers;
  the rubber is selected from the group consisting of natural rubber (NR), ethylene-propylene-diene rubbers (EPDMs), styrene/diolefin rubbers, polybutadiene rubber (BR), polyisoprene (IR), butyl rubber (IIR), halobutyl rubber (XIIR), nitrile rubber (NBR), hydrogenated nitrile rubber (H-NBR), carboxylated butadiene/acrylonitrile rubber (XNBR), polychloroprene (CR), and mixtures of two or more of the aforementioned rubbers; and
  the polyamide is PA6, PA66, PA610, PA88, PA612, PA810, PA108, PA9, PA613, PA614, PA812, PA1010, PA10, PA814, PA148, PA1012, PA11, PA1014, PA1212, PA12, or mixtures of the listed polyamides, or copolyamides containing caprolactam as comonomer.

17. The composite part as claimed in claim 16, wherein:
  the rubber is at least one rubber selected from the group consisting of natural rubber (NR), ethylene-propylene-diene rubber (EPDM), styrene/diolefin rubber (SBR), carboxylated butadiene/acrylonitrile rubber (XNBR), polychloroprene (CR), nitrile rubber (NBR), and polybutadiene (BR); and
  the polyamide is at least one of amide selected consisting PA6, PA66, PA 6/66, PA6/PA66, PA12/PA1012, PA12/1212, PA612/PA12, and PA613/PA12.

* * * * *